US012580370B2

(12) United States Patent (10) Patent No.: US 12,580,370 B2
Young et al. (45) Date of Patent: Mar. 17, 2026

(54) CABLE TRAY EXIT

(71) Applicant: ERICO International Corporation, Solon, OH (US)

(72) Inventors: Dennis Young, Amherst, OH (US); Tom Colangelo, Lombard, IL (US); Eric J. Wilson, Solon, OH (US)

(73) Assignee: ERICO International Corporation, Solon, OH (US)

( * ) Notice: Subject to any disclaimer, the term of this patent is extended or adjusted under 35 U.S.C. 154(b) by 35 days.

(21) Appl. No.: 18/444,328

(22) Filed: Feb. 16, 2024

(65) Prior Publication Data

US 2024/0283230 A1     Aug. 22, 2024

Related U.S. Application Data

(60) Provisional application No. 63/485,342, filed on Feb. 16, 2023.

(51) Int. Cl.
H02G 3/00        (2006.01)
H02G 3/04        (2006.01)

(52) U.S. Cl.
CPC ................................. H02G 3/0456 (2013.01)

(58) Field of Classification Search
None
See application file for complete search history.

(56) References Cited

U.S. PATENT DOCUMENTS

| | | |
|---|---|---|
| 2,662,709 A | 12/1953 | Ullberg, Jr. |
| 5,384,937 A | 1/1995 | Simon |

| | | |
|---|---|---|
| 5,937,131 A | 8/1999 | Haataja et al. |
| 6,192,181 B1 | 2/2001 | Haataja et al. |
| 6,476,327 B1 | 11/2002 | Bernard et al. |
| 6,522,823 B1 | 2/2003 | Wentworth et al. |
| 6,546,179 B2 | 4/2003 | Petri |
| 6,586,680 B1 | 7/2003 | Nelson |
| 6,625,373 B1 | 9/2003 | Wentworth et al. |
| 6,763,169 B2 | 7/2004 | Wentworth et al. |
| 6,855,884 B2 | 2/2005 | Spagnoli et al. |
| 6,915,056 B2 | 7/2005 | Wentworth et al. |
| 7,184,644 B2 | 2/2007 | Johnson et al. |
| 7,476,801 B1 | 1/2009 | Davis et al. |
| 7,546,987 B2 | 6/2009 | Sinkoff |
| 7,601,922 B2 | 10/2009 | Larsen et al. |
| 7,608,786 B2 | 10/2009 | Deciry et al. |
| 7,954,287 B2 | 6/2011 | Bravo et al. |
| 7,954,776 B2 | 6/2011 | Davis et al. |
| 7,959,019 B2 | 6/2011 | Jette |
| 8,106,311 B2 | 1/2012 | Larsen et al. |

(Continued)

FOREIGN PATENT DOCUMENTS

| | | |
|---|---|---|
| AU | 2010101522 A4 | 1/2015 |
| CN | 205231646 U | 5/2016 |

(Continued)

*Primary Examiner* — Steven M Marsh

(74) *Attorney, Agent, or Firm* — Quarles & Brady LLP

(57)        ABSTRACT

Exit adapters are disclosed to provide cable exits for cable trays, including cable trays formed from lattices of wires. An exit adapter can include a ramp that defines a cable path. Some exit adapters can be selectively installed in either of a first orientation or a second orientation, to route cable out of a cable tray (e.g., for use with, respectively, a modified cable tray or an unmodified cable tray).

20 Claims, 18 Drawing Sheets

(56) References Cited

U.S. PATENT DOCUMENTS

| | | | |
|---|---|---|---|
| 8,263,863 B2 | 9/2012 | Young | |
| 8,315,069 B2 | 11/2012 | Caveney | |
| 8,319,120 B2 | 11/2012 | Caveney | |
| 8,502,071 B2 | 8/2013 | Caveney et al. | |
| 9,466,959 B2 | 10/2016 | Larsen et al. | |
| 9,784,938 B2 | 10/2017 | Kellerman | |
| 9,819,163 B1 | 11/2017 | Winn | |
| 9,935,446 B2 | 4/2018 | Kellerman | |
| 9,939,102 B2 | 4/2018 | Kellerman | |
| 9,958,090 B2 | 5/2018 | Kellerman | |
| 10,433,658 B1 | 10/2019 | Kologe | |
| 10,559,950 B2 | 2/2020 | Kellerman | |
| 10,944,246 B1 | 3/2021 | Marsh | |
| 11,283,250 B2 | 3/2022 | Kellerman et al. | |
| 2003/0116682 A1 | 6/2003 | Finco et al. | |
| 2005/0063775 A1 | 3/2005 | Boltz | |
| 2008/0023212 A1 | 1/2008 | Larsen et al. | |
| 2010/0038496 A1 | 2/2010 | Sjoqvist | |
| 2012/0211609 A1 | 8/2012 | Mandic | |
| 2015/0214703 A1 | 7/2015 | Larsen et al. | |
| 2015/0380918 A1* | 12/2015 | Kellerman | G02B 6/44526 248/68.1 |
| 2016/0197464 A1* | 7/2016 | Kellerman | F16M 13/02 248/68.1 |
| 2016/0308339 A1* | 10/2016 | Kellerman | H02G 3/0443 |
| 2017/0250529 A1 | 8/2017 | Kellerman | |
| 2020/0144802 A1 | 5/2020 | Kellerman | |
| 2022/0224090 A1 | 7/2022 | Sledzinski et al. | |
| 2022/0269026 A1 | 8/2022 | Arvilla et al. | |
| 2023/0049944 A1* | 2/2023 | Hoch | B60R 9/08 |
| 2023/0354544 A1* | 11/2023 | Petri | G02B 6/444 |
| 2024/0106213 A1* | 3/2024 | White | F16L 3/26 |
| 2024/0283230 A1* | 8/2024 | Young | H02G 3/0456 |

FOREIGN PATENT DOCUMENTS

| | | |
|---|---|---|
| CN | 107046258 A | 8/2017 |
| DE | 202012010205 U1 | 11/2012 |
| EP | 1206022 A1 | 5/2002 |
| EP | 1376807 B1 | 11/2016 |
| GB | 2467030 A | 7/2010 |
| JP | 5588799 B2 | 9/2014 |
| KR | 20-0476352 Y1 | 3/2015 |
| KR | 10-1738450 B1 | 5/2017 |
| KR | 10-1836393 B1 | 3/2018 |
| WO | 2012/168655 A1 | 12/2012 |
| WO | 2016/099309 A1 | 6/2016 |
| WO | 2018/145694 A1 | 8/2018 |

* cited by examiner

200

240A  240B 240A  240B

200
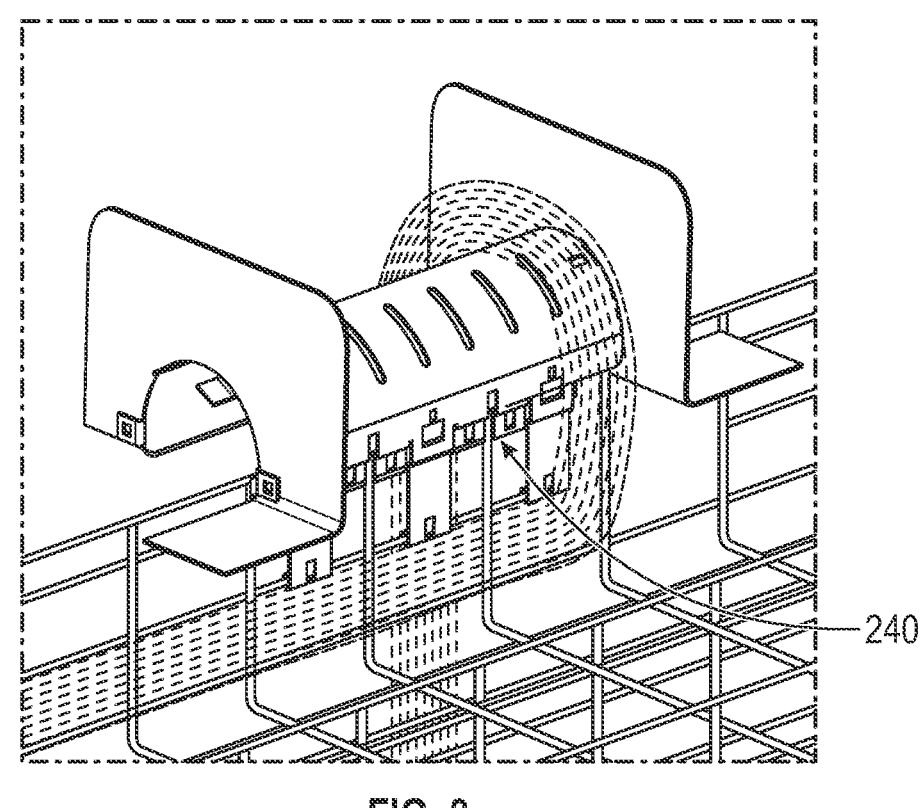
FIG. 8
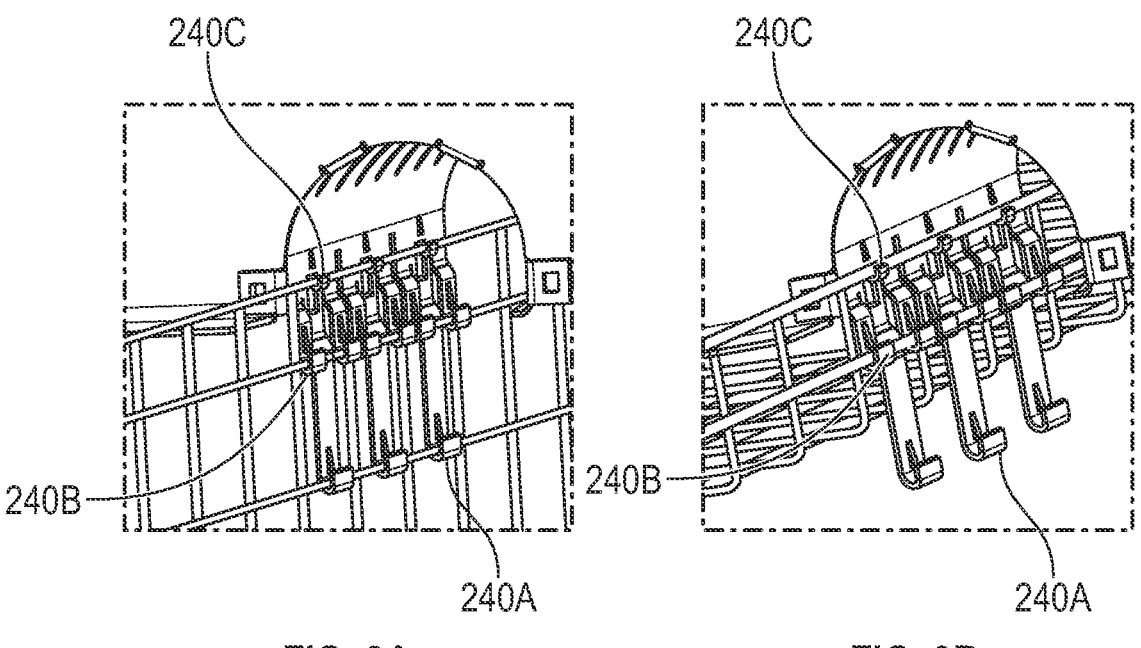
240C
240B
240A
FIG. 9A
240C
240B
240A
FIG. 9B

500

530

500

520

CABLE TRAY EXIT

CROSS-REFERENCE TO RELATED APPLICATIONS

This application claims priority to U.S. Provisional Patent Application No. 63/485,342, filed Feb. 16, 2023, the entirety of which is incorporated herein by reference.

BACKGROUND

Cable trays can be used to support cables for data or power transmission in a variety of settings. Cable trays generally include a floor and sides, typically with a generally U-shaped cross-section. Some cable trays are formed from grids of wires, with a pattern of longitudinal and lateral wires extending along and transverse to an elongate direction of the cable tray, respectively, to form a horizontal floor and vertical sides. Large numbers of cables can be supported by cable tray along any variety of distances, with bundles of cables entering or exiting the cable tray at various locations for routing of power or other signals to or from various components.

SUMMARY

Some embodiments of the invention provide an exit adapter for a cable tray with a ramp that defines a support surface for cable that extends between a first end of the ramp and a second end of the ramp. A first side wall can be connected to the ramp at a first side of the ramp, and a second side wall can be connected to the ramp at a second side of the ramp opposite the first side. The first end of the ramp can include first support hooks. The second end of the ramp can include one or more second support hooks, and support tabs that extends transverse to the support surface at the second end of the ramp. The exit adapter can have a first installed orientation and a second installed orientation. In the first installed orientation, the first end can be oriented to provide a first cable entrance onto the ramp from the cable tray. The first support hooks can be oriented to engage a floor of the cable tray to secure the ramp to the cable tray with the support surface extending through a side of the cable tray that extends upwardly from the floor. In the second installed orientation, the second end can be oriented to provide a second cable entrance onto the ramp from the cable tray. The one or more second support hooks and the support tabs can be oriented to engage the side of the cable tray to secure the ramp to the cable tray with the support surface extending over the side of the cable tray.

In some examples, in the first installed orientation the first end of the ramp can be higher than the second end of the ramp, and in the second installed orientation the second end of the ramp can be higher than the first end of the ramp. In some examples, the first end of the ramp can extend past first ends of the first and second side walls. In some examples, free ends of the first support hooks extend back towards the first and second side walls. In some examples, the support tabs can extend integrally from the one or more second support hooks.

Some embodiments of the invention provide a method of supporting cables relative to a cable tray. The method can include selectively orienting an exit adapter for installation in either of a first orientation or a second orientation and selectively installing the exit adapter. The exit adapter can include a ramp that extends between a first end and a second end, a first side wall connected to the ramp at a first side of the ramp, and a second side wall connected to the ramp at a second side of the ramp opposite the first side. The exit adapter can be selectively installed in the first installed orientation by engaging a floor of the cable tray with first support hooks that extend from the first end of the ramp, to secure the ramp to the cable tray with the first end providing a first cable entrance onto the ramp from the cable tray and with a support surface of the ramp extending through a side of the cable tray that extends upwardly from the floor. The exit adapter can be selectively installed in the second installed orientation by engaging the side of the cable tray with one or more second support hooks that extend from the second end of the ramp and with support tabs that extend from the second end of the ramp, to secure the ramp to the cable tray with the second end providing a second cable entrance onto the ramp from the cable tray at a second height above the floor, with the support surface extending over the side of the cable tray, and with the support tabs extending transverse to the support surface at the second end of the ramp.

In some examples, selectively installing the exit adapter in the first installed orientation can include installing the exit adapter to extend through a cut section of a side wall of the cable tray. In some examples, selectively installing the exit adapter in the first installed orientation can include engaging the first support hooks on a first wire of the floor and further seating the exit adapter on a second wire of the floor different from the first wire. In some examples, installing the exit adapter in the first installed orientation can further include securing the first support hooks to a common longitudinal wire of the floor of the cable tray using fasteners. In some examples, installing the exit adapter in the first installed orientation can further include securing the first support hooks to a longitudinal wire of the floor of the cable tray and bending side support tabs that extend from the first end of the ramp to engage transverse wires of the floor of the cable tray.

In some examples, installing the exit adapter in the second installed orientation can further include engaging the one or more second support hooks with a first longitudinal wire of the side of the cable tray and engaging the support tabs with a second longitudinal wire of the side of the cable tray that is spaced vertically apart from the first longitudinal wire. The one or more second support hooks can be engaged with the first longitudinal wire from an inner side of the side of the cable tray and the support tabs can be engaged with the second longitudinal wire from an outer side of the side of the cable tray. In some examples, installing the exit adapter in the second installed orientation can further include passing the support tabs through the side of the cable tray, from the inner side to the outer side, to engage the support tabs with the second longitudinal wire. In some examples, installing the exit adapter in the second installed orientation can further include securing the support tabs to the second longitudinal wire using fasteners.

Some embodiments of the invention provide an exit adapter for a cable tray with sides and a floor formed of wires. A ramp can define a first end of the ramp and a second end of the ramp, with a first side wall connected to a first side of the ramp, and a second side wall connected to a second side of the ramp. The ramp, first side wall, and second side wall can define a cable path, with a first entrance direction for cable defined between the first and second side walls at the first end of the ramp, and a second entrance direction for cable defined between the first and second side walls at the second end of the ramp. The second entrance direction can be transverse to the first entrance direction. The first end of the ramp can include a first support hook that extends to a free end along the first entrance direction. The second end of the ramp can include a second support hook and a support tab that extends transverse to the second entrance direction. In a first installed orientation, the exit adapter can provide a first entrance onto the ramp from the cable tray at the first end of the ramp, with the first support hook oriented to engage with the floor of the cable tray to secure the ramp at a first height above the floor. In a second installed orientation, the exit adapter can provide a second entrance onto the ramp from the cable tray at the second end of the ramp, with the second support hook and the support tab oriented to engage a side of the cable tray to secure the ramp at a second height above the floor.

In some examples, the first support hook, second support cook, and support tab can be integrally formed with the ramp. In some examples, the first end of the ramp can further include a first plurality of support hooks, including the first support hook, where each support hook of the plurality of support hooks is oriented to engage the floor of the cable tray to secure the ramp at the first height above the floor in the first installed orientation. In other examples, the second end of the ramp can further include a plurality of support tabs that extend transverse to the second entrance direction, including the support tab. Each support tab of the plurality of support tabs can be oriented to engage the side of the cable tray to secure the ramp at a second height above the floor (e.g., that is larger than the first height) in the second installed orientation. In some examples, the plurality of support tabs can extend from the second support hook.

In the second installed orientation, in some examples, the plurality of support tabs can extend (e.g., from the second support hook) transverse to the second entrance direction. The plurality of support tabs can be oriented to engage a different longitudinal wire of the side of the cable tray than the second support hook.

In some examples, the first end of the ramp can extend past first ends of the first and second side walls in a direction opposite the first entrance direction. In some examples, the first end of the ramp can further include side support tabs arranged to engage the floor of the cable tray with the exit adapter in the first installed orientation. In some examples, the side support tabs can be bendable to engage transverse wires of the floor of the cable tray in the first installed orientation. In some examples, the first end of the ramp can include a first opening and the first support hook can include a second opening. The first and second openings can be aligned to receive a fastener to secure the first support hook to a longitudinal wire of the floor in the first installed orientation.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology:

FIGS. 8 through 9B illustrate the exit adapter of FIGS. 5 and 6 installed in a second orientation, at different heights on unmodified cable trays.

DETAILED DESCRIPTION

Figure 1:
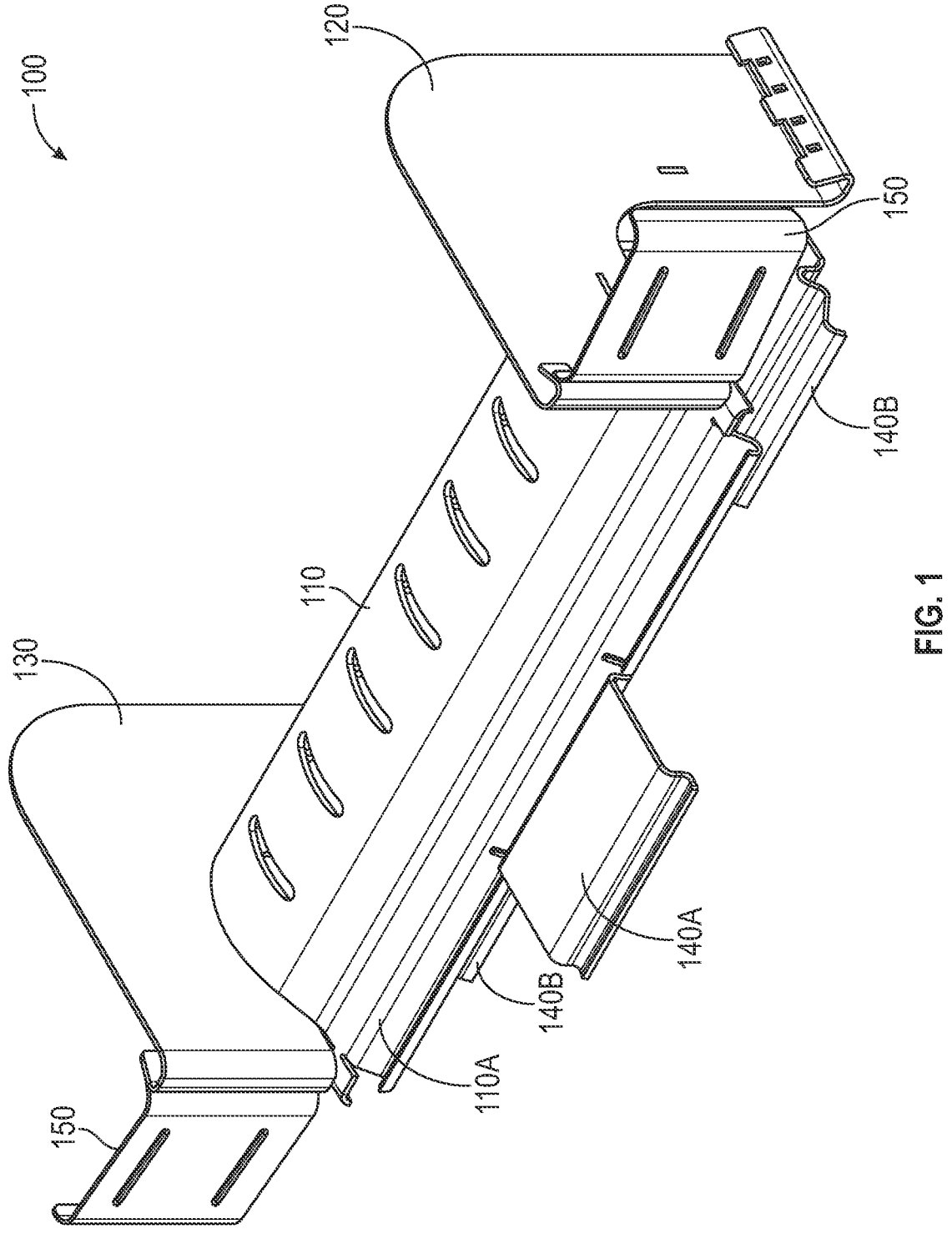
FIGS. 1 and 2 are isometric and side views of an exit adapter for a cable tray, including a detail view of a clip for a guide wing.

Before any examples of the disclosed technology are explained in detail, it is to be understood that the invention is not limited in its application to the details of construction and the arrangement of components set forth in the following description or illustrated in the following drawings. The invention is capable of other examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use examples of the disclosed technology. Various modifications to the illustrated examples will be readily apparent to those skilled in the art, and the generic principles herein can be applied to other examples and applications without departing from the disclosed technology. Thus, the disclosed technology is not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of disclosed technology. Skilled artisans will recognize the examples provided herein have many useful alternatives and fall within the scope of the disclosed technology.

In various installations, electrical or datacom cables can be routed along cable trays that are mounted to overhead structures (e.g., suspended from ceiling structures by threaded rods). Some cable trays are formed as wire baskets, with a lattice of wires that form a floor to support cables and sides that extend from the floor to contain the cables or generally provide improved strength for the cable tray. For example, longitudinal wires can extend along an elongate direction of a cable tray section, and can be joined together by lateral wires that extend transversely across the longitudinal wires (e.g., perpendicularly thereto). In some examples, cable trays can exhibit U-shaped cross-sectional profiles, including with sides that extend perpendicularly to a floor (e.g., vertically upward from a horizontal floor). Due to manufacturing tolerances and other factors, the particular orientation or location of longitudinal or transverse wires of a cable tray may vary between different cable trays. Further, different cable trays can include different numbers or different geometric configurations of wires (e.g., different numbers, heights, or inter-wire spacings of longitudinal wires along sides or a floor of a tray).

To route cables onto or off of a cable tray, it may sometimes be necessary for the cables to be passed over or through a side of the cable tray. For example, to reach a server cabinet or other relevant system, cables may need to pass up and over a side of an unmodified wire cable tray (i.e., a tray with continuous longitudinal wires along a relevant section of a side of the cable tray). In contrast, cables may need to pass through an open section of a side of a modified wire tray (i.e., a tray with longitudinal wires along a side of the cable tray that have been cut or otherwise ended to provide an opening for the cables to pass through). In some examples, modified cable trays may include one or more portions with a fully open side (i.e., with no longitudinal wires along a side of the tray over a particular length of the tray).

Generally, various types of exit adapters (or cable exits) can be installed on cable trays to help route and protect cables passing onto or off of a cable tray. However, conventional exit adapters may not be readily adaptable to different types of trays (e.g., with different wire spacing or side height), or may not be readily usable with both modified and unmodified trays. Conventional exit adapters are also typically configured to be installed in only a single orientation, with corresponding limitations in adaptability to varied applications, and potentially burdensome inventory requirements (e.g., regarding management of different exit adapters for different exit configurations).

Some examples of the disclosed technology can address these or other issues. For example, some configurations include support tabs that extend from the one or more ends of an exit adapter (e.g., from opposing ends of a ramp, relative to a cable path). The support tabs can be oriented to engage wires of a floor or a side of a cable tray, to selectively secure the exit adapter in different installed orientations to route cable from (or to) the cable tray. For example, some exit adapters can be selectively secured to extend through a side wall of a tray (e.g. at a modified section of the tray) or to extend over the side wall of the tray (e.g., at an unmodified section of the tray), with corresponding differences in heights of the cable tray in some cases.

In some examples, one or more support tabs at a first end of a ramp can be configured to engage wires of a cable tray to secure the exit adapter in a first orientation, and one or more support tabs at a second end of the ramp can be configured to engage wires of a cable tray to secure the exit adapter in a second orientation.

In a first orientation, for example, the ramp can be aligned to guide cables through an open section of a side of a modified cable tray (e.g., with one or more first tabs engaged with one more wires of a floor of the cable tray). Correspondingly, for example, the ramp may extend through the open section of the cable tray in some configurations. In contrast, in a second orientation, the ramp can be aligned to guide cables over the top of a side of an unmodified cable tray (e.g., with one or more second tabs engaging one or more wires of the side of the cable tray). Correspondingly, for example, the ramp may extend above a top longitudinal wire of a side of the cable tray in some configurations.

In some examples, hooks can extend from a cable tray by various distances. For example, support tabs may include hooked ends that define a partially enclosed volume to receive wires of a cable tray. Correspondingly, a first set of hooks can engage one or more wires of a floor of a cable tray to secure an exit adapter in a first orientation (e.g., on a modified cable tray). Further, a second (e.g., different) set of hooks can engage multiple wires of a side of a cable tray to secure the exit adapter in a second orientation for an unmodified cable tray.

In some examples, a combination of hooked and other support structures can collectively engage a side or a floor of a cable tray to secure an exit adapter in a particular installed orientation. For example, some exit adapters can include a hooked structure at an end of the ramp and also one or more unhooked (or other) support tabs. For example, one or more support tabs can be integrally formed with an extended hooked structure, with the support tab(s) extending transverse to the ramp at the relevant end. In an installed orientation, the hooked structure can receive a first longitudinal wire of a side of a cable tray and the support tab(s) can extend to engage a second wire of the cable tray (e.g., a second longitudinal wire, below the first longitudinal wire). Thus, for example, the hooked structure and the support tab(s) can collectively provide responsive forces onto the cable tray in opposing directions, to secure the cable exit for routing of cables.

In some cases, side walls of an exit adapter can be configured to be selectively secured to a ramp with the ramp aligned in different directions (e.g., in-field, with snap-in or other similar engagements). Thus, users may be able to use a common set of parts to selectively configure a cable adapter for use with modified or unmodified (or otherwise varied) cable trays. In some cases, guide wings can be similarly (or otherwise) selectively configurable, to help guide cables from the cable tray onto the ramp whether a ramp is installed facing in a first direction or a second direction, relative to the side walls.

In some cases, a ramp of an exit adapter can be vertically adjustable relative to side walls or other structures of the exit adapter, so that the ramp can be selectively adjusted to accommodate a variety of heights of a side of a cable tray (e.g., to selectively accommodate modified and unmodified trays). For example, a slotted engagement between brackets that secure an exit adapter to a cable tray and a ramp or side walls of the exit adapter can allow a ramp to be adjusted (e.g., continuously) to a variety of heights relative to a floor of the cable tray.

Although particular lattice patterns, wire spacings, and wire cross-sections are illustrated in the various figure, the principles disclosed herein are not limited to those particular patterns, spacings, or cross-sections. Rather, the principles of the disclosed technology can be implemented with appropriate variation according to mechanical principles. For example, pattern, spacing, size, or shape of grooves, hooks, or other features that engage wires of a tray, to secure the exit adapter to the tray, can be varied as appropriate to correspond to a particular pattern, spacing, or cross-section of wires of a cable tray). Further, examples of the disclosed technology can be readily adapted to engage other types of cable trays (e.g., formed from rigid support members other than latticed wires).

FIG. 1 illustrates an example exit adapter 100 that includes a ramp 110 that defines a path for cables between first and second ends 110A, 110B of the ramp 110. Side walls 120, 130 are connected at opposite sides of the ramp 110 to help bound the cable path and provide structural support for the ramp 110. A support tab 140A extends adjacent the first end 110A of the ramp 110, and support tabs 140B extend adjacent to the second end 110B of the ramp 110.

In particular, in the illustrated example, the support tab 140A extends substantially in parallel with the ramp 110 and the support tab 140B extends transverse (e.g., substantially perpendicular to) the ramp 110. Further, the support tab 140A extends from (or includes) an elongate hook structure connected to the first end 110A of the ramp 110, and the support tabs 140B extend from a bent support gusset at the second end 110B of the ramp, with one support tab 140B at each opposing side of the ramp 110. Each of the support tabs 140A, 140B also includes a hook structure (e.g., an elongate groove, as shown) that is sized and oriented to engage wires of a relevant tray (e.g., as further discussed below). In other examples, however, other configurations are possible. For example, some support tabs can be differently oriented or shaped, differently connected to a ramp, differently spaced, or included in different numbers.

Figure 3A:
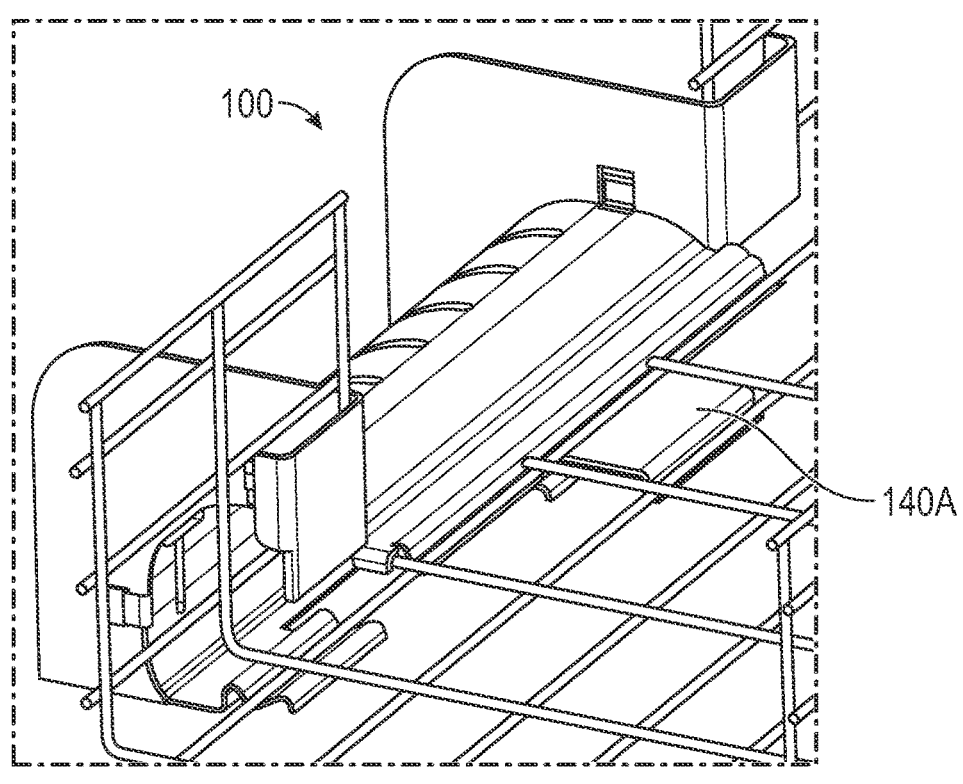
FIGS. 3A and 3B illustrate an alternative configuration of the exit adapter of FIGS. 1 and 2 installed in a first orientation, with a modified cable tray.
Figure 3B:
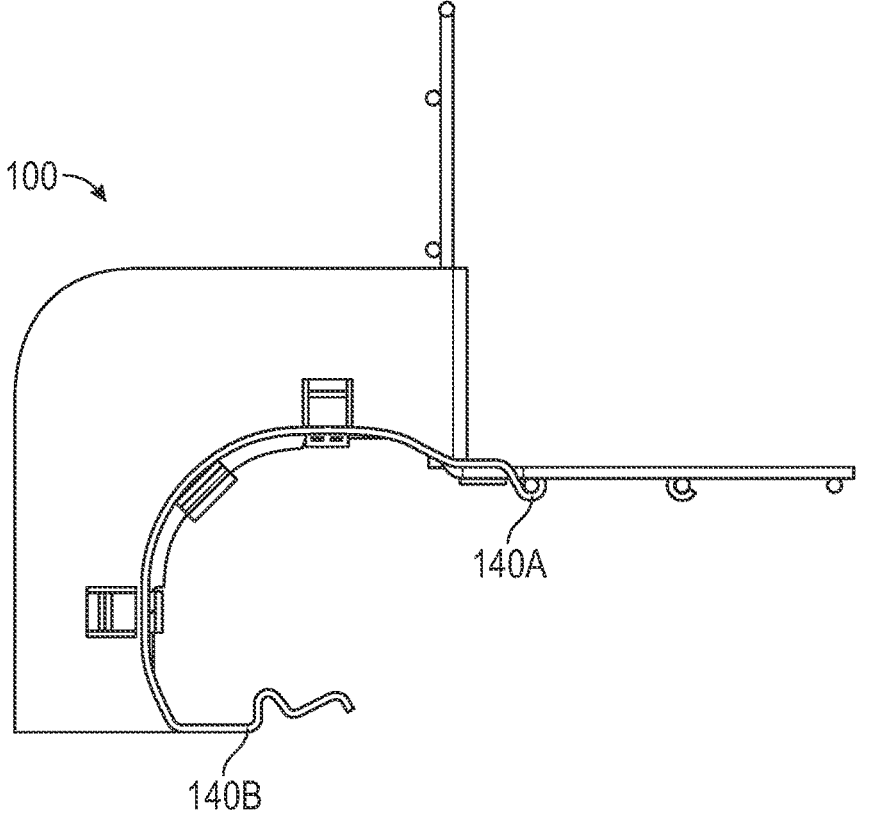

As shown in FIGS. 3A and 3B, the exit adapter 100 can be aligned in a first orientation to be secured to a modified cable tray, to receive cables (not shown) from the cable tray via the first end 110A of the ramp 110. The first end 110A of the ramp 110 can be supported on wires of the cable tray (e.g., on lateral floor wires, via side tabs, as shown), with other wires of the cable tray seated in the grooves of the support tab 140A and in the elongate hook structure from which the support tab 140A extends (e.g., longitudinal floor wires, as shown). Thus, opposing contact with the wires of the cable tray can firmly secure the exit adapter 100 against the vertical load and moment of a larger mass of cables.

Figure 4A:
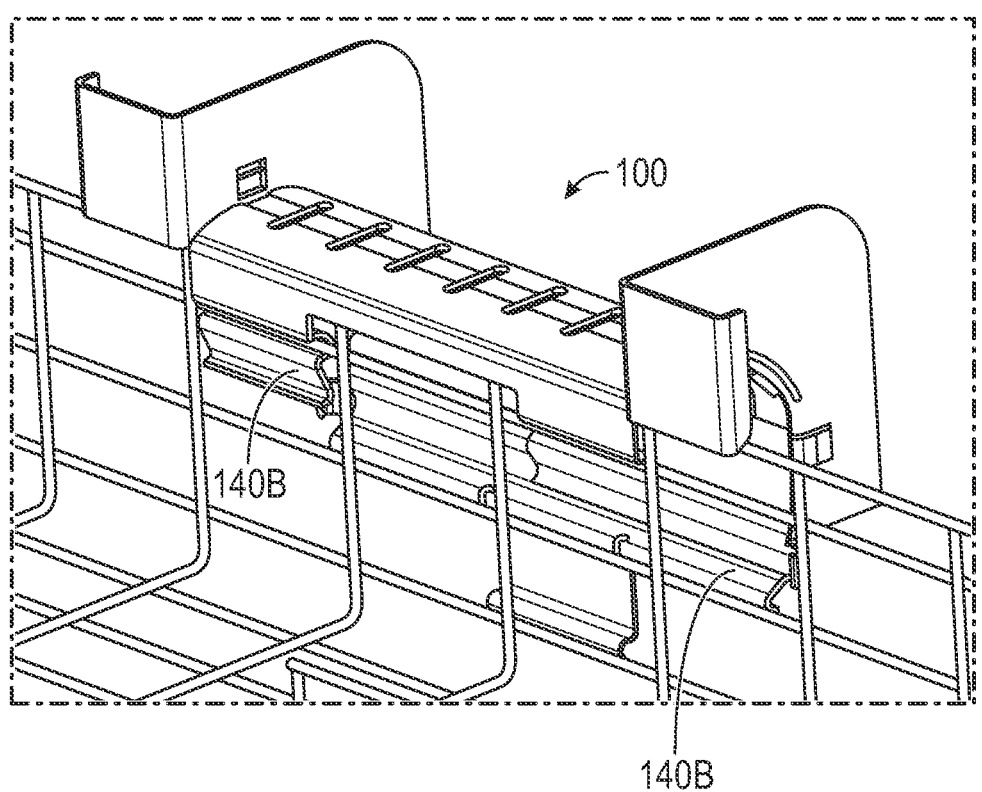
FIGS. 4A and 4B illustrate the alternate configuration of the exit adapter of FIGS. 1 and 2 installed in a second orientation, with an unmodified cable tray.
Figure 4B:
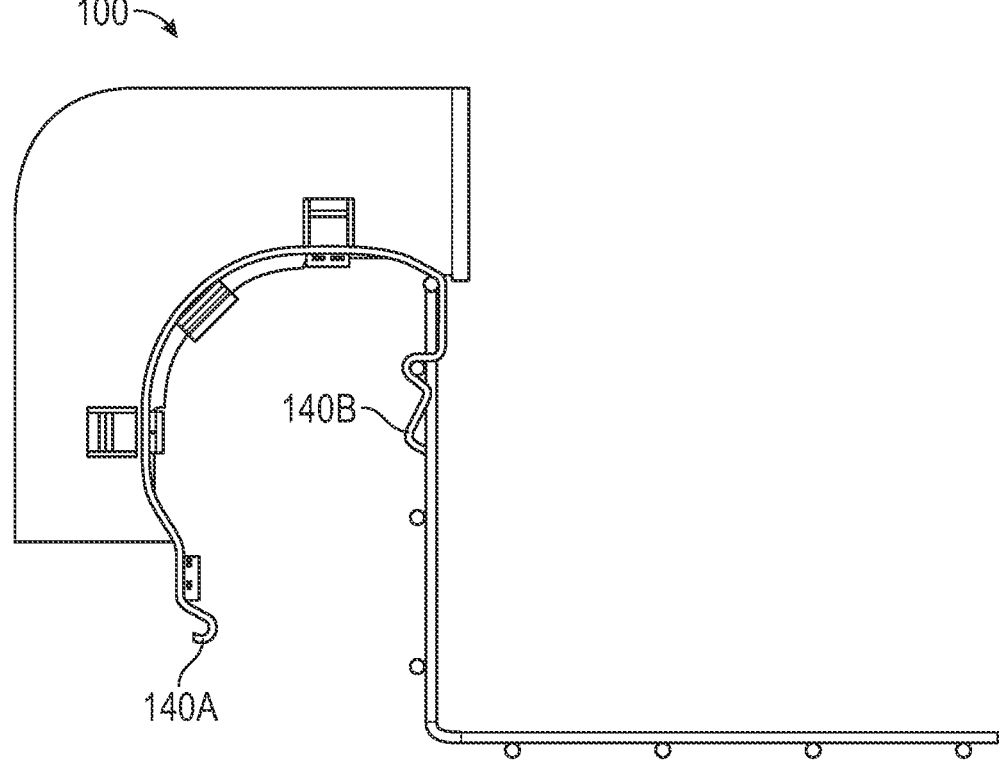

As shown in FIGS. 4A and 4B, the exit adapter 100 can be aligned in a second orientation to be secured to an unmodified cable tray, to receive cables (not shown) from the cable tray via the second end 110B of the ramp 110. The second end 110B of the ramp 110 can be supported on wires of the cable tray (e.g., on a top longitudinal side wires, as shown), with other wires of the cable tray seated in the groove of the support tabs 140B (e.g., an adjacent longitudinal side wire, as shown). Thus, in this reversed installation, opposing contact with the wires of the cable tray can still firmly secure the exit adapter 100 against the vertical load and moment of a larger mass of cables.

In other examples, other configurations are possible, including relative to the various particular engagements between a ramp, a support tab, and wires of a cable tray. For example, as generally noted above, differently configured hook structures can be used in some cases, or differently shaped or located support tabs can be included. Similarly, other examples may be configured to engage the cable tray at different locations (e.g., to engage different wires). In some examples, separate mounting hardware (e.g., fasteners or brackets) can be provided to further secure a particular support tab (or other feature) to one or more wires of a cable tray, as needed.

Figure 2:
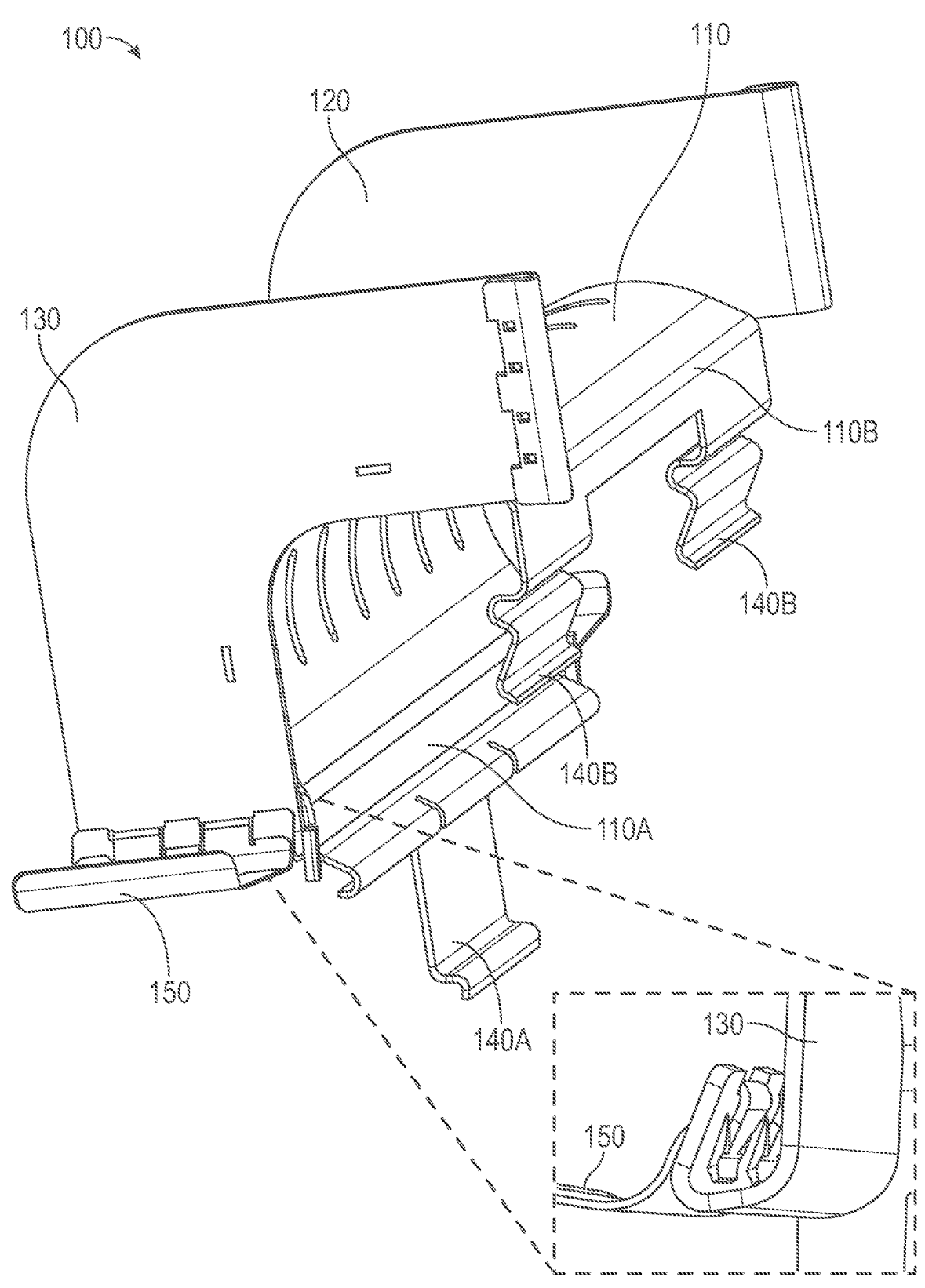

In some installations, it may be useful to provide further guide structures to protect cables from wear or over-bending at the entrance to a ramp. Particularly for exit adapters configured for installation in different orientations, it can be useful to provide attachable (e.g., and also removable) guide structures, so that users can selectively align the guide structures adjacent a tray end of a ramp. In this regard, for example, the exit adapter 100 can include support guides configured as attachable guide wings 150. The guide wings 150 can be selectively secured to the exit adapter 100 at different locations so as to be appropriately aligned to guide cables regardless of the installed orientation of the exit adapter 100. As shown in the configuration of FIGS. 1 and 2 in particular, the guide wings 150 include clips (e.g., spring steel clips) that can be selectively engaged with corresponding structures on the side walls 120, 130 adjacent to opposing ends of the ramp 110. Thus, corresponding to the alignment of guide structures 150 in FIGS. 3A through 4B, the guide wings 150 of FIGS. 1 and 2 can be selectively aligned adjacent to the tray end of the ramp 110.

In some cases, side walls of an exit adapter can be interchangeable to allow for more streamlined manufacturing and inventory management. For example, in the configuration illustrated in FIGS. 1 and 2, the side walls 120, 130 are substantially identical and can thus be manufactured as the same part for attachment at each side of the ramp 110. As discussed above, the attachable guide wings 150 can then be aligned as desired, to correspond to the selected installation orientation.

As an alternative (or other modification), some side walls of exit adapters can be configured for installation on a particular side of ramp for a particular installation orientation. For example, as shown in FIGS. 3A through 4B, guide wings 150 can be integrally formed with the respective side wall 120, 130. Correspondingly, the side walls 120, 130 are configured to be selectively secured to either side of the ramp 110, to selectively align the guide wings 150 with either of the first or second ends 110A, 110B of the ramp 110. Side walls can be thus selectively secured in a variety of ways, including with snap-in clips (as shown), bendable tabs, spot welding (e.g., during manufacture), etc.

Figure 5:
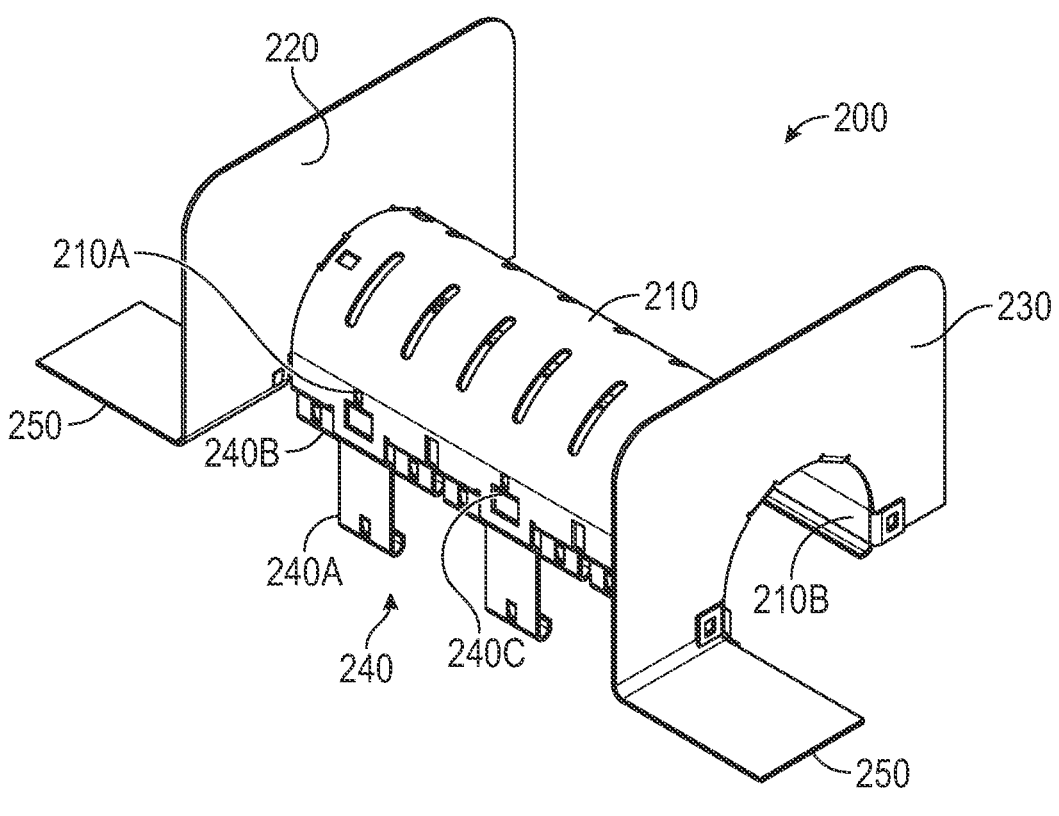
FIGS. 5 and 6 are isometric and side views of an example exit adapter for a cable tray.
Figure 6:
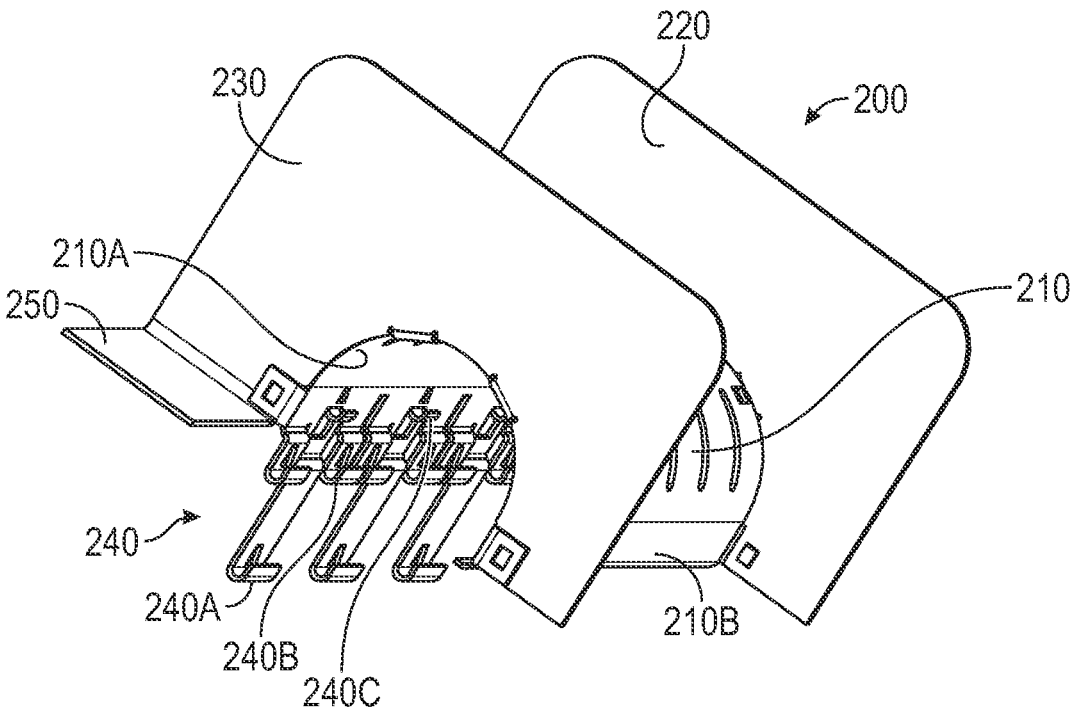

Some configurations can include other structures to selectively secure a cable tray at different locations. For example, FIGS. 5 and 6 illustrate another exit adapter 200. In some regards, the exit adapter 200 is similar to the exit adapter 100, including with a ramp 210, side walls 220, 230, and guide wings 250 generally similar to the similarly numbered features discussed above. Accordingly, discussion of these similarly numbered features for the exit adapter 100 also generally applies to the exit adapter 200.

Figure 7A:
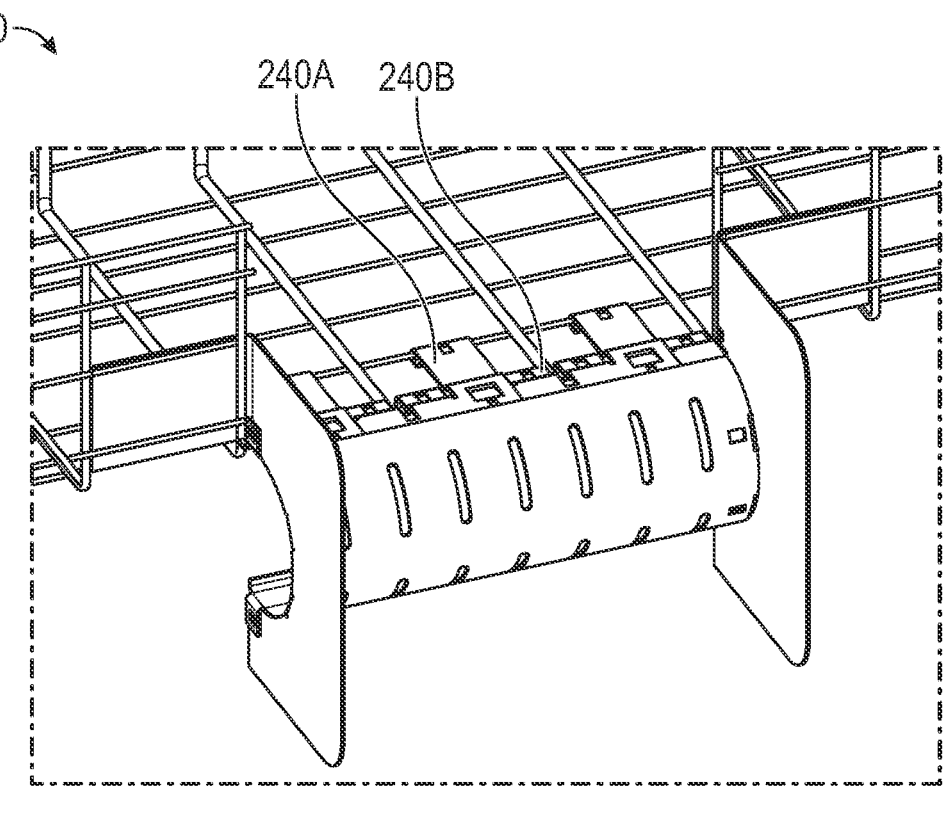
FIGS. 7A and 7B illustrate the exit adapter of FIGS. 5 and 6 installed in a first orientation, on a modified cable tray.
Figure 7B:
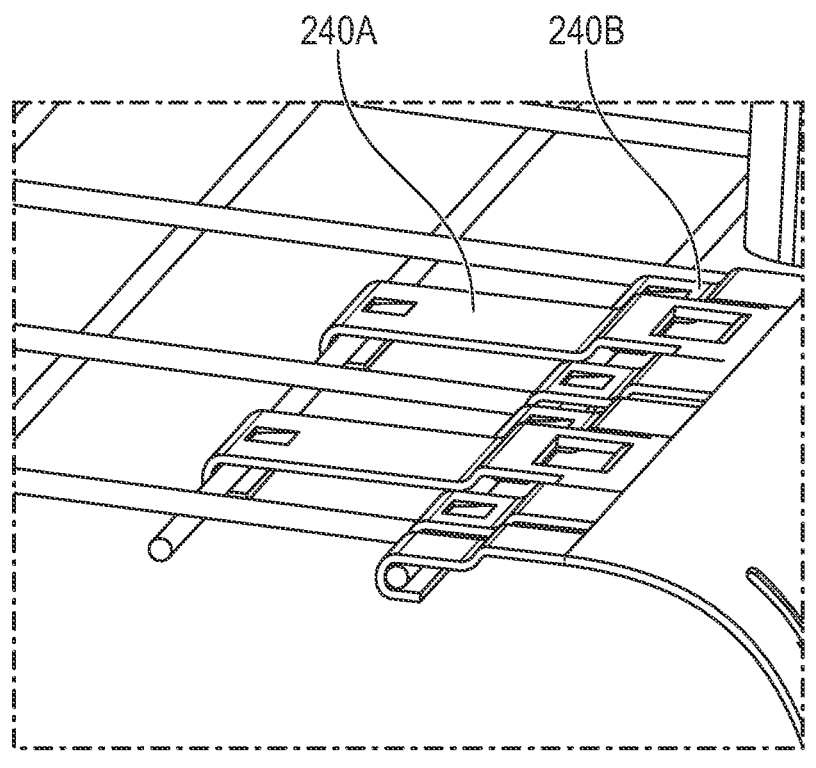

In some regards, however, the exit adapter 200 differs from the exit adapter 100. For example, the exit adapter 200 includes a set of hooks 240 extending at a first end 210A of the ramp 210 (e.g., on tabs extending from the ramp 210, as shown). As shown in FIGS. 7A and 7B, the hooks 240 can engage wires of the floor of a modified cable tray to secure the exit adapter 200 to the tray. In particular, as shown in FIG. 7B, a longer (i.e., more extended) set of the hooks 240A can exhibit a deeper hook structure with a detent feature, and a shorter (i.e., less extended) set of the hooks 240B can exhibit include a biased catch. Thus, for example, a first longitudinal wire can be seated in the hooks 240A to align the tray, then a second longitudinal wire can be captured in the hooks 240B to secure the exit adapter 200 in place.

As shown in FIGS. 8 through 9B, the hooks 240 can also be used to secure the exit adapter 200 in a rotated orientation, on an unmodified tray. Depending on the spacing of the side wires of the tray, the same or different hooks can be used to secure the exit adapter 200 in the illustrated orientation. For example, as shown in FIGS. 8 and 9A, the hooks 240A, 240B can also be sed to secure the exit adapter 200 to the side of a taller unmodified tray. As shown in FIG. 9B, another set of hooks 240C can be used to secure the exit adapter 200 to the side of a shorter unmodified tray (e.g., in combination with the hooks 240B, as shown). As shown in FIGS. 8 and 9A, for some wire or hook spacings, the three sets of hooks 240A, 240B, 240C can collectively secure the exit adapter 200 to the side of a taller (or other) tray.

In other examples, other configurations are possible. For example, catches, detents or other protrusions to retain wires can be included (or not included) on different hooks or with different configurations than illustrated. Further, different hooks can exhibit different depths, different sets of hooks can extend by different distances from an end of a ramp, including by a zero or negative distance (i.e., extending from the ramp along the cable path), and different sets of hooks can be configured to engage different cable tray wires (e.g., simultaneously or in varied orders).

In some examples, slotted or other slidable connections (e.g., groove or rail connections, substituted for the slotted connections discussed below) can be used to allow a height of a ramp to be selectively adjusted relative to a floor of a cable tray. For example, FIGS. 10 through 20 illustrate exit adapters 300, 400, 500 with adjustable-height ramps 310, 410, 510. The exit adapters include generally similar components as the exit adapters 100, 200 and thus corresponding discussion above also applies to the exit adapters 300, 400, 500 (e.g., relative to side walls, the shape or other configuration of hooks or tabs to engage wires, etc.).

Figure 10:
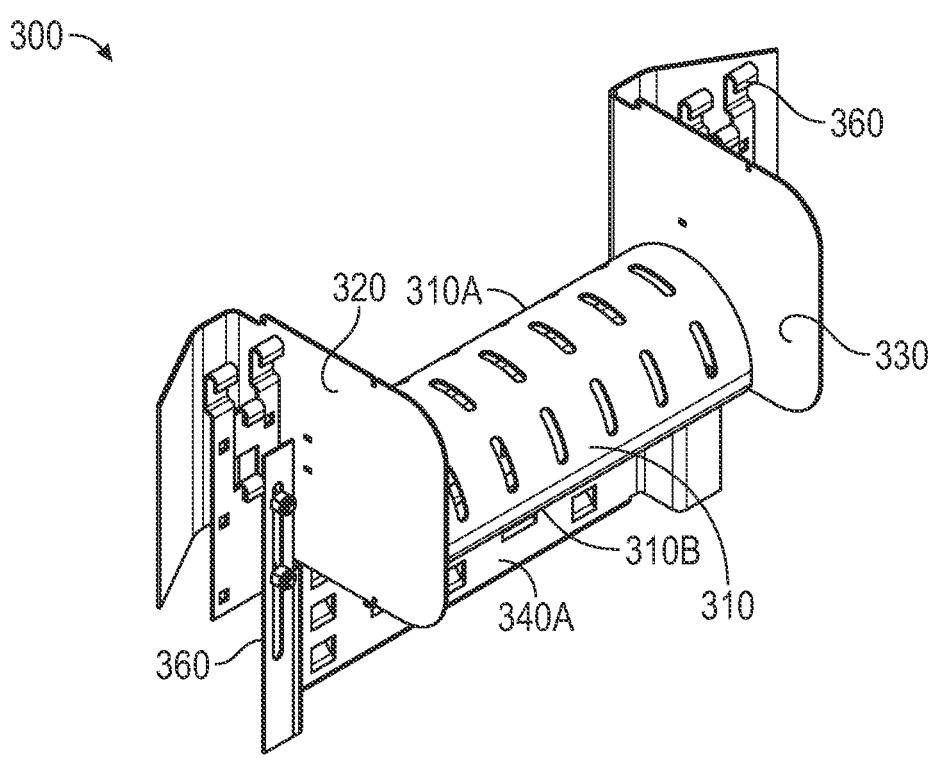
FIG. 10 is an isometric view of an example exit adapter for a cable tray.
Figure 11:
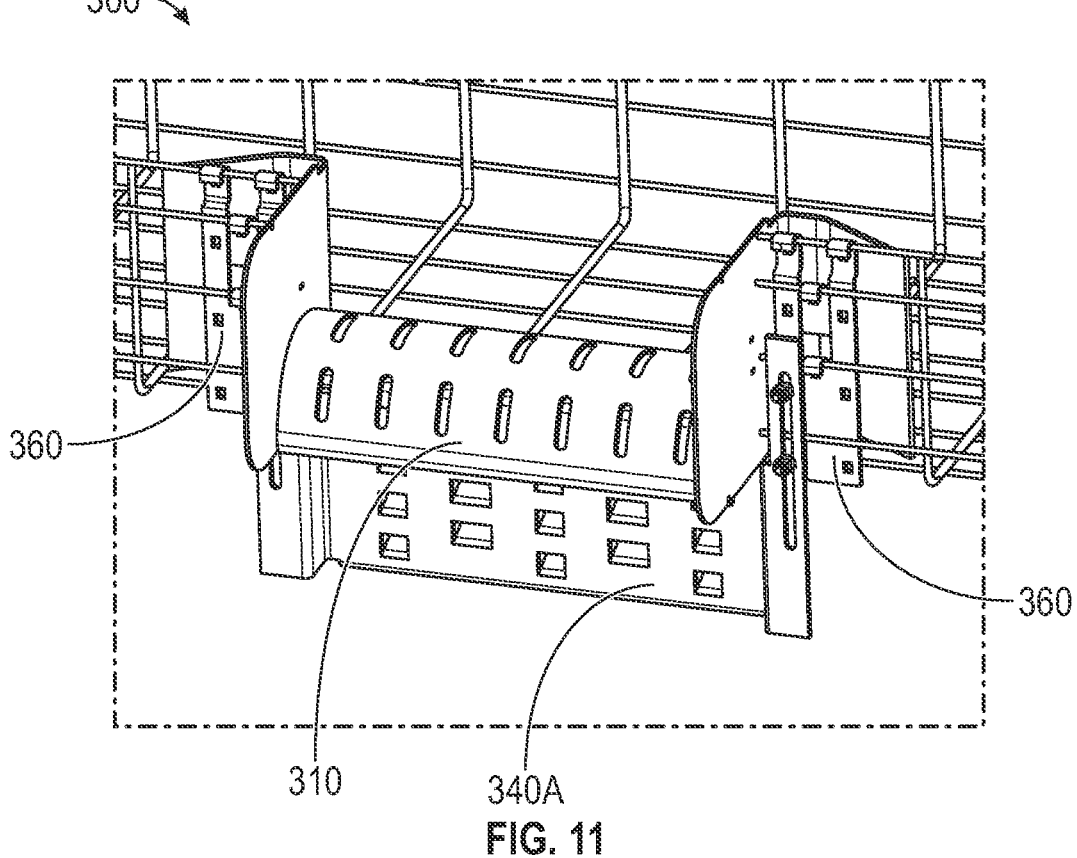
FIG. 11 is a perspective view of the exit adapter of FIG. 10 installed on a modified cable tray.

Referring to FIGS. 10 and 11, to allow adjustment of a height of the ramp 310, the exit adapter 300 includes a slotted connection to allow slidable movement between the support brackets 360 and the ramp 310. In particular, fasteners can extend from the support brackets 360 through slots on a support structure 340A that extends from a tray end 310A of the ramp 310. Thus, the ramp 310 (along with side walls 320, 330) can be slidably adjusted to any of a range of heights relative to the brackets 360. As shown in FIG. 11, the brackets 360 can accordingly support the ramp 310 at a variety of heights relative to a tray, including to accommodate cable exits for a modified tray or an unmodified tray (not shown). Further, as also generally discussed below, hooks on the support structure 340A can also be aligned to engage wires on the tray (e.g., a first longitudinal floor wire) to further support or secure the exit adapter 300.

Figure 12:
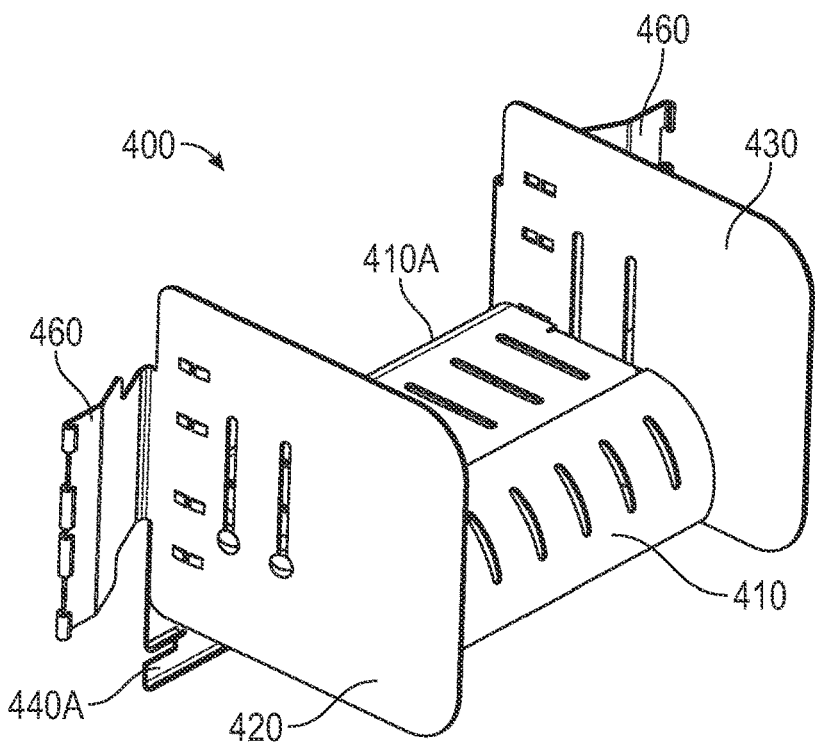
FIGS. 12 and 13 are isometric views of an example exit adapter for a cable tray.
Figure 13:
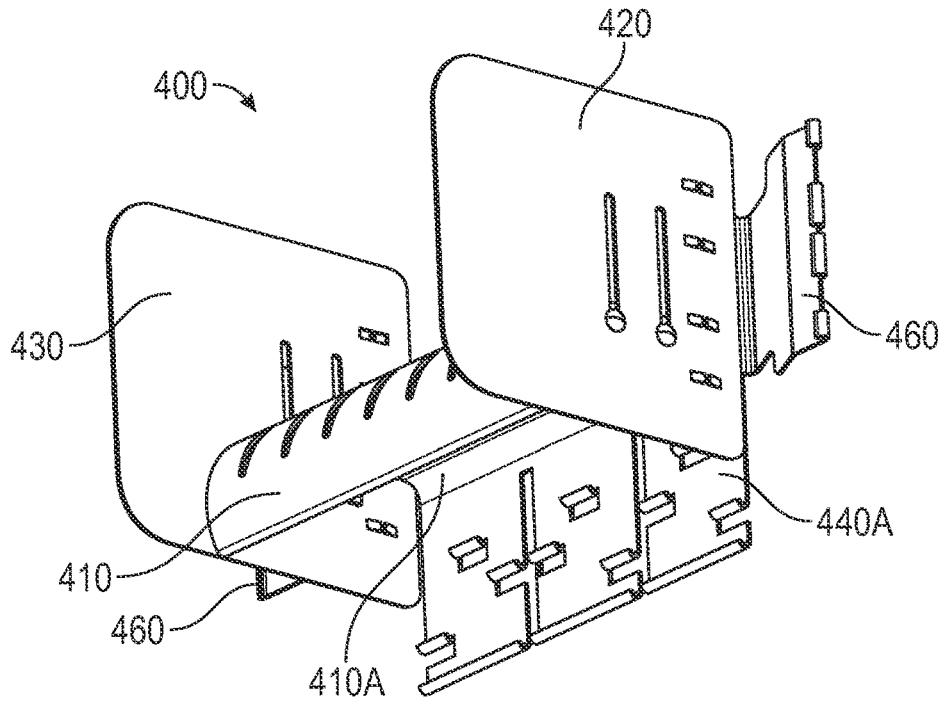
Figure 14:
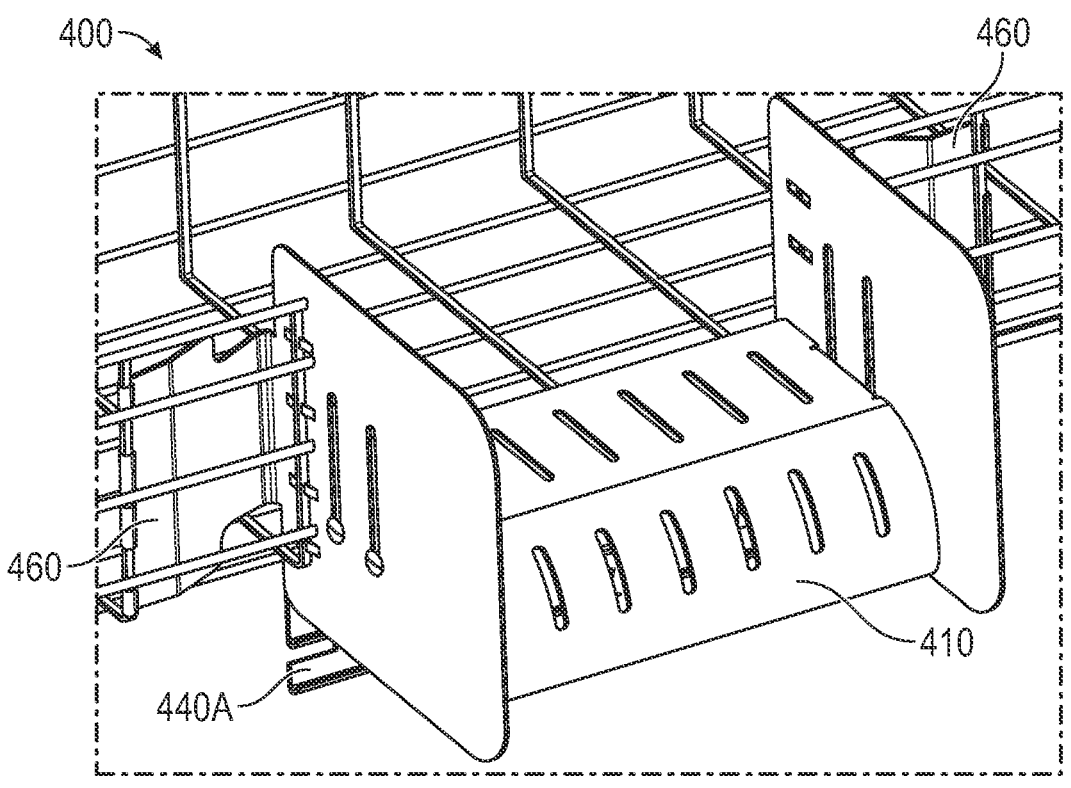
FIGS. 14 and 15 illustrate the exit adapter of FIGS. 12 and 13 installed on a modified cable tray.
Figure 15:
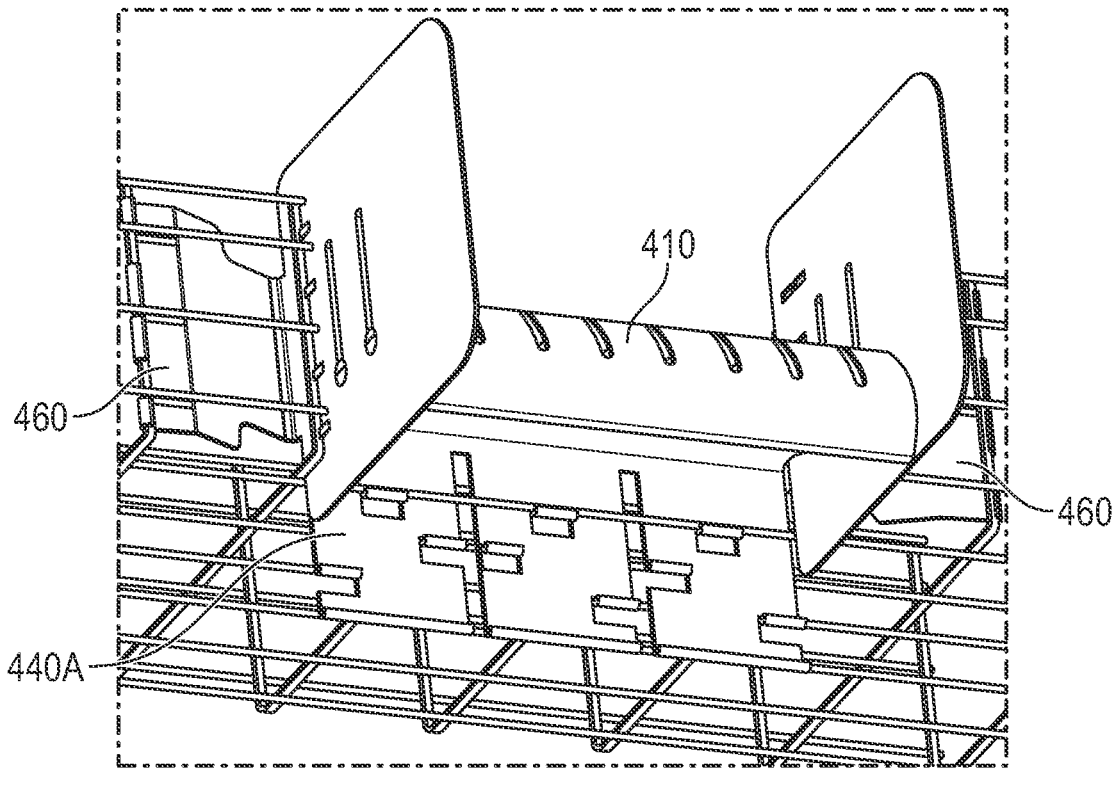

In other examples, other configurations may be possible with otherwise similar adjustability. For example, although a particular arrangement of hooks on the brackets 360 is shown, other configurations are possible, including to accommodate differently configured cable trays. Further, some examples can include slots or fasteners on other components, including in slotted arrangements with slots on side walls at opposing sides of a ramp. In this regard, for example, FIGS. 12 and 13 illustrate the exit adapter 400, in which the ramp 410 is secured to side walls 420, 430 via sets of elongate slots that allow sliding height adjustment the ramp 410. With the side walls 420, 430 secured to a cable tray, as shown in FIGS. 14 and 15, the ramp 410 can thus be adjusted to a particular height relative to a floor of the cable tray, including to accommodate cable exits for a modified tray or an unmodified tray (not shown).

In the illustrated example, the side walls 420, 430 are secured to the cable tray with wings brackets 460. In particular, the wing brackets 460 include distal hooked structures to engage wires of a cable tray (e.g., vertical wires of a side of a cable tray) and are secured at proximal ends to the side walls 420, 430 (e.g., with bent tabs, or clip in structures). Of note, thus oriented, the brackets 460 can also serve as guides for cable entering the ramp 410 from the tray. Additionally, hooks on an extended support structure 440A at the tray end of the ramp 410 can also engage a tray to further support or secure In other examples, however, other configurations are possible. For example, other attachment brackets can be used, one or more attachment brackets can be integrally connected to a side wall or can be connected to a ramp, and different slot structures can be used.

Figures 16, 17:
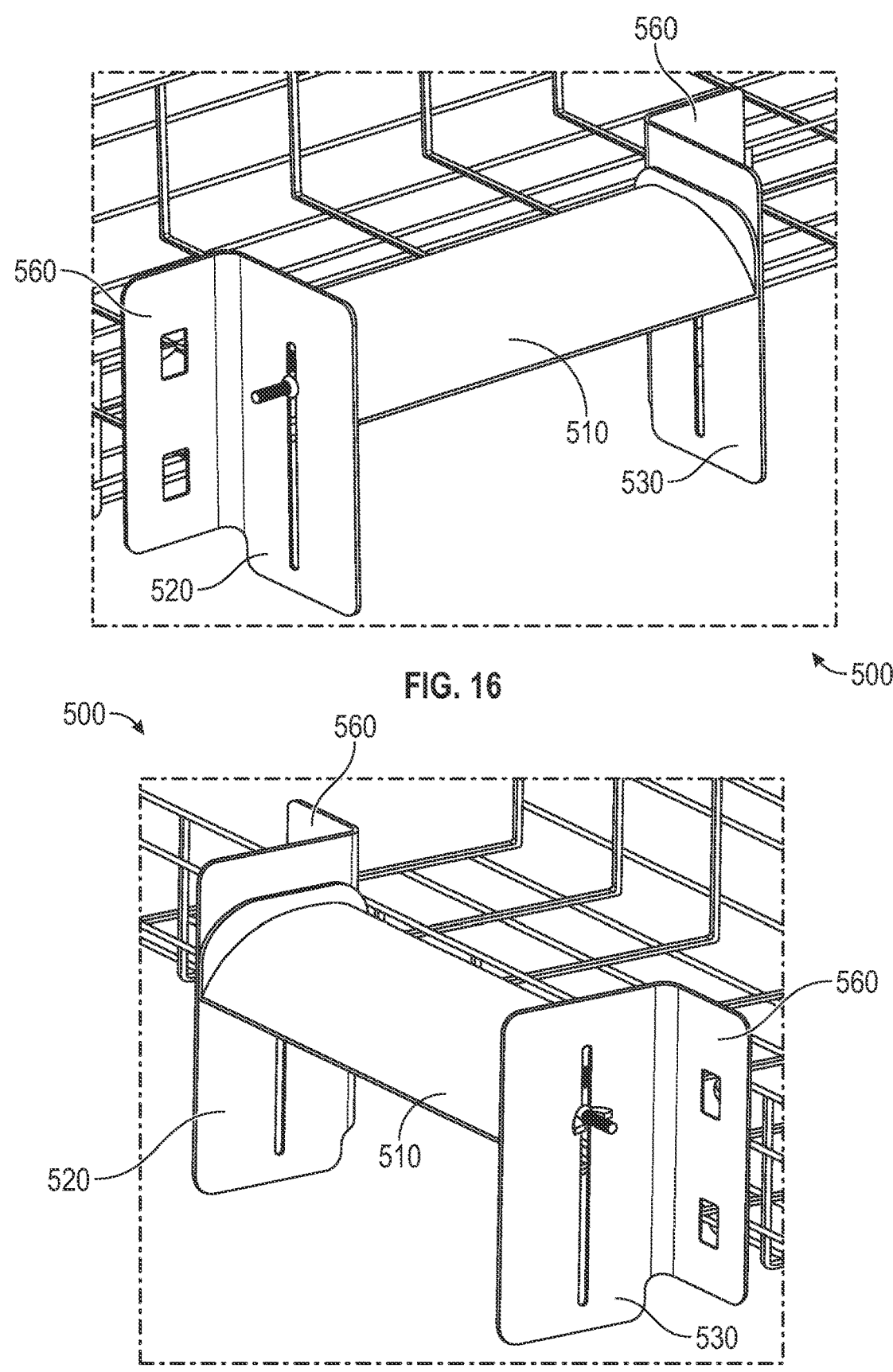
FIGS. 16 and 17 illustrate an example exit adapter for a cable tray installed on a modified cable tray.
Figure 18A:
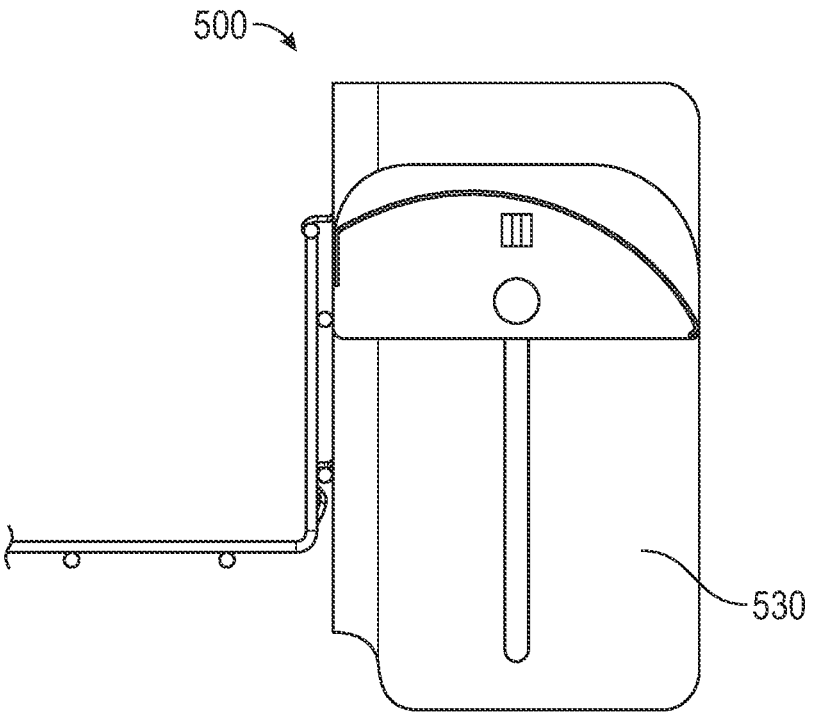
FIGS. 18A and 18B illustrate aspects of a height adjustment system of the exit adapter of FIGS. 16 and 17.
Figure 18B:
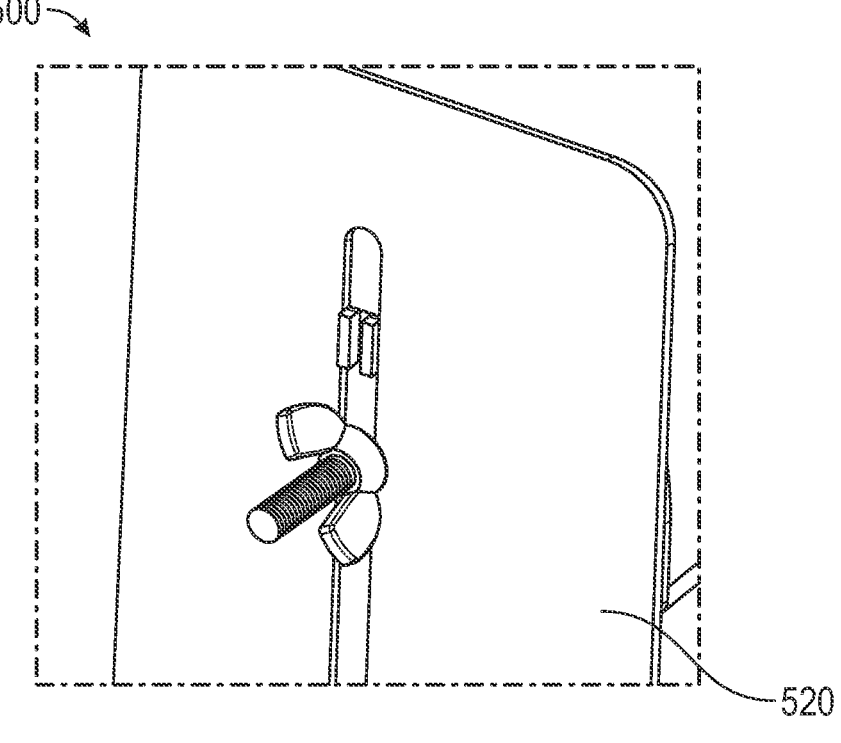

In the exit adapter 500 of FIGS. 16 and 17, for example, support bracket 560 are integrally formed with side walls 520, 530 for simplified attachment to a cable tray. Further, as shown in FIGS. 18A and 18B, the slotted arrangement for height adjustment of the ramp 510 can include a single adjustment slot on each of the side walls 520, 530 (e.g., rather than two, as shown in the preceding example). Further, one or more protrusions (e.g., two tabs, as shown) can extend into (e.g., through) the adjustment slot on each of the side walls 520, 530. These protrusion(s) extending into the slots can thus, for example, in combination with another connector through the slot (e.g., a threaded fastener, as shown), provide more smoothly guided height adjustment.

In other examples, other configurations of an exit adapter may include variations of the length of a ramp between first and second ends or a width of a ramp between first and second sides, or variations in structures that secure the exit adapter to modified or unmodified cable tray (including with various substitutions or additions, as generally discussed below). In some examples, a first end of a ramp may be configured to extend along (e.g., above) a portion of a floor of a cable tray, and be secured to the floor of the cable tray with one or more first support hooks that extend from the first end of the ramp. In some examples, a second end of a ramp may be configured to extend above a longitudinal wire of a portion of a side of a cable tray, and be secured to the side of the cable tray with one or more second support hooks and one or more transverse support tabs that extend from the second end of the ramp. In this regard, for example, the cable exit can be selectively secured with the second support hook(s) and transverse support tab(s) engaging a top (or first) longitudinal wire and a lower (or second) longitudinal (or other) wire, respectively, of a side of an unmodified cable tray (e.g., by selectively rotating the exit ramp between different installed orientations for engagement with a cable tray). Correspondingly, some examples of the disclosed exit adapter can be selectively secured with a ramp extending over a side of a cable tray or with the ramp extending through a side of a cable tray, to alternatively provide a first entrance from the cable tray onto a support surface of the ramp at a first end of the ramp or a second entrance from the cable tray onto the support surface at a second end of the ramp.

Figure 19:
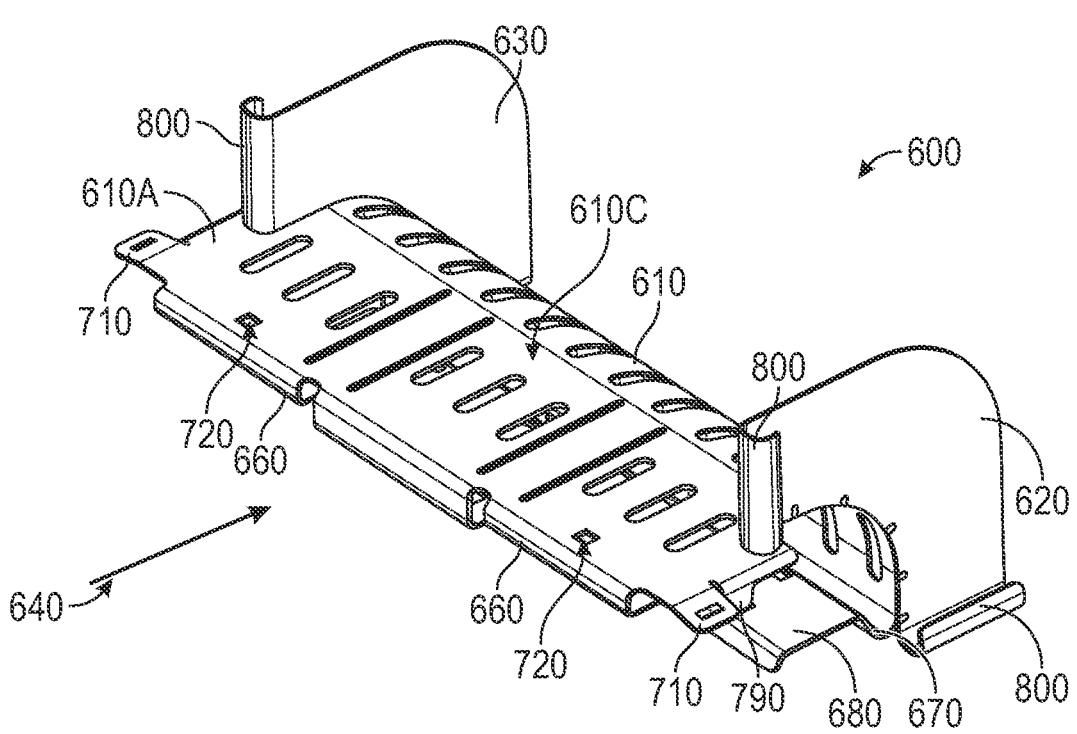
FIGS. 19 and 20 are isometric views of an example exit adapter for a cable tray, in different orientations.
Figure 20:
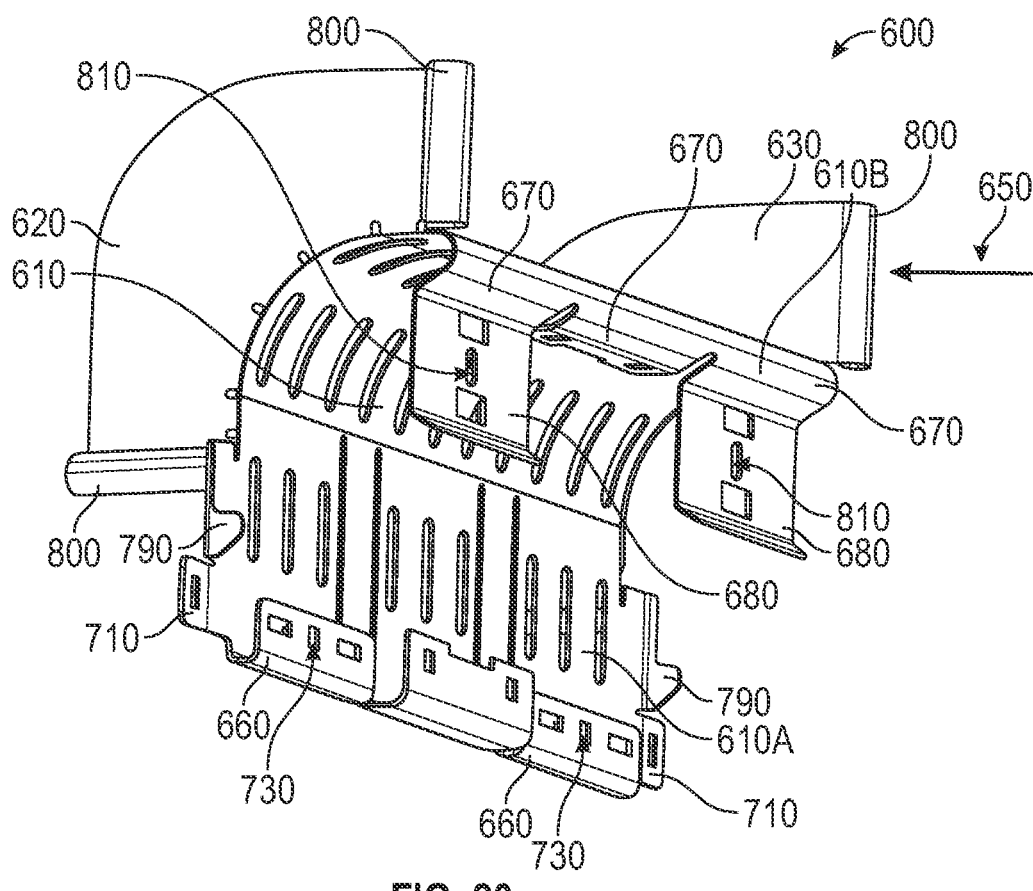

In some examples, including as shown in FIGS. 19 and 20, an exit adapter 600 may include a ramp 610, which extends between a first end 610A and a second end 610B. A side wall 620 and side wall 630 may each be connected to a respective side of the ramp 610, with the side wall 620 on an opposite side of the ramp 610 from side wall 630. In some examples, the first end 610A of the ramp 610 extends past the first and second side wall 620, 630 in a direction opposite the first entrance direction 640. The side walls 620, 630 define bounds of an open-topped channel that provides a cable path for the routing of cables (see, e.g., cable 750 as shown in FIGS. 21B and 22B). Although the cable 750 and other cables are shown only in select figures, those of skill in the art will recognize the possibility of similarly oriented cables in other installations and configurations of an exit adapter as disclosed herein.

Still referring to FIGS. 19 and 20, the first end 610A, side wall 620, and side wall 630 define a first entrance direction 640 for cable 750 at the first end 610A (see FIG. 19), along with a corresponding opposing exit direction (as also generally noted below). Further, the second end 610A, side wall 620, and side wall 630 define a second entrance direction 650 for cable 750 at the second end 610B (see FIG. 20), along with a corresponding opposing exit direction. In the illustrated example, the first entrance direction is a substantially horizontal direction relative to the installation orientation of FIG. 19 (and a corresponding horizontally installed cable tray). Similarly, the second entrance direction 650 is a substantially horizontal direction relative to the installation orientation shown in FIG. 20 (and a corresponding horizontally installed cable tray). In other examples, other entrance directions are possible, including with various deviations from horizontal. Further, while entrance directions at opposing ends of the ramp may be substantially perpendicular to each other in some examples (e.g., as shown in FIGS. 19 and 20), other relative orientations are possible for entrance directions at opposing ends of other ramps (e.g., any of various transverse orientations).

As noted above, a side wall may include a guide wing in some examples. In the illustrated examples, the side wall 620 includes two guide wings 800, a guide wing 800 located at the first end 610A, and a guide wing 800, located at the second end 620A, as shown in FIG. 19. In some installations, a guide wing may engage with a vertical wire in a side wall of the wire tray. In some installations, a guide wing may provide a smooth transition for a cable to enter or exit the exit adapter, so that the cable does not turn too sharply between the tray and the exit adapter or engage with exposed edges of the wire tray or other component.

In some examples, the first end 610A includes at least one side support tab 790. In some configurations, the at least one side support tab 790 may be located on a same side of the first end 610A as the side wall 620. In other configurations, the at least one side support tab 790 may be located on a same side of the first end 610A as the side wall 630. In some examples, including as shown, the side support tabs 790 are located on both sides of the first end 610A, in alignment with the side wall 620 and the side wall 630.

In some configurations, the first end 610A includes at least one first support hook 660. For example, a hooked support tab may extend from a connection with a support surface 610C of the ramp 610 to a free end of the hook, to define an interior area into which wires of a cable tray can be received. In particular, in the illustrated example, the first support hook 660 extends along the first entrance direction 640, from a furthest extent of the first support hook 660, back toward the ramp 610, to a free end of the support hook 660. Thus, the support hook 660 can provide improved retention of cable tray wires, corresponding to improved retention of the exit adapter 600 on a tray.

In some examples, including as shown in FIGS. 19 and 20, the free end of the first support hook 660 may extend in parallel or substantially in parallel with the first entrance direction 640. In some examples, the free end of the first support hook 660 may be oriented in other directions relative to the first entrance direction 640, including so as to extend along the first entrance direction 640 obliquely thereto, or so as to extend perpendicular to the first entrance direction 640. In some examples, the at least one first support hook 660 may be integrally formed with the ramp 610.

In some examples, the first end 610A may include a first opening 720 (e.g., along a support surface of the ramp 610), and the first support hook 660 may include a second opening 730. The first opening 720 and the second opening 730 can be aligned relative to each other, for example, to receive a fastener to secure the support hook 660 to a wire, as further discussed below.

Figure 21A:
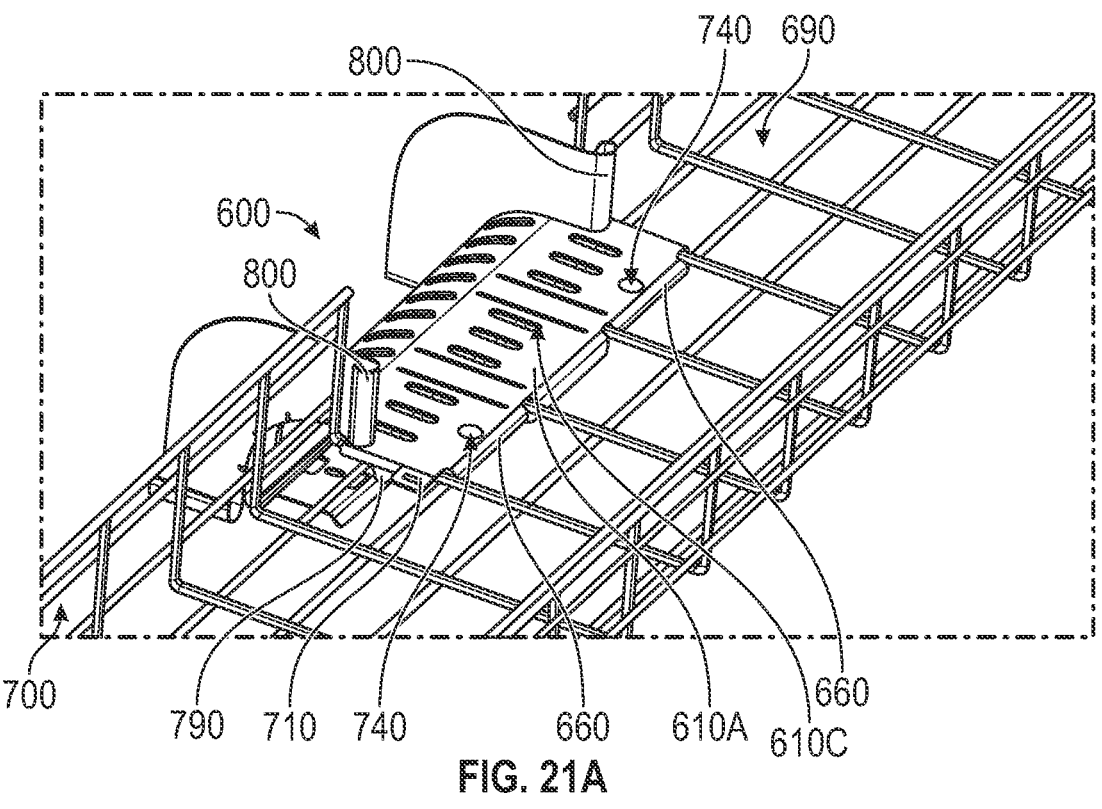
FIGS. 21A and 21B illustrate the exit adapter of FIGS. 19 and 20 installed in a first installed orientation on a modified cable tray.
Figure 21B:
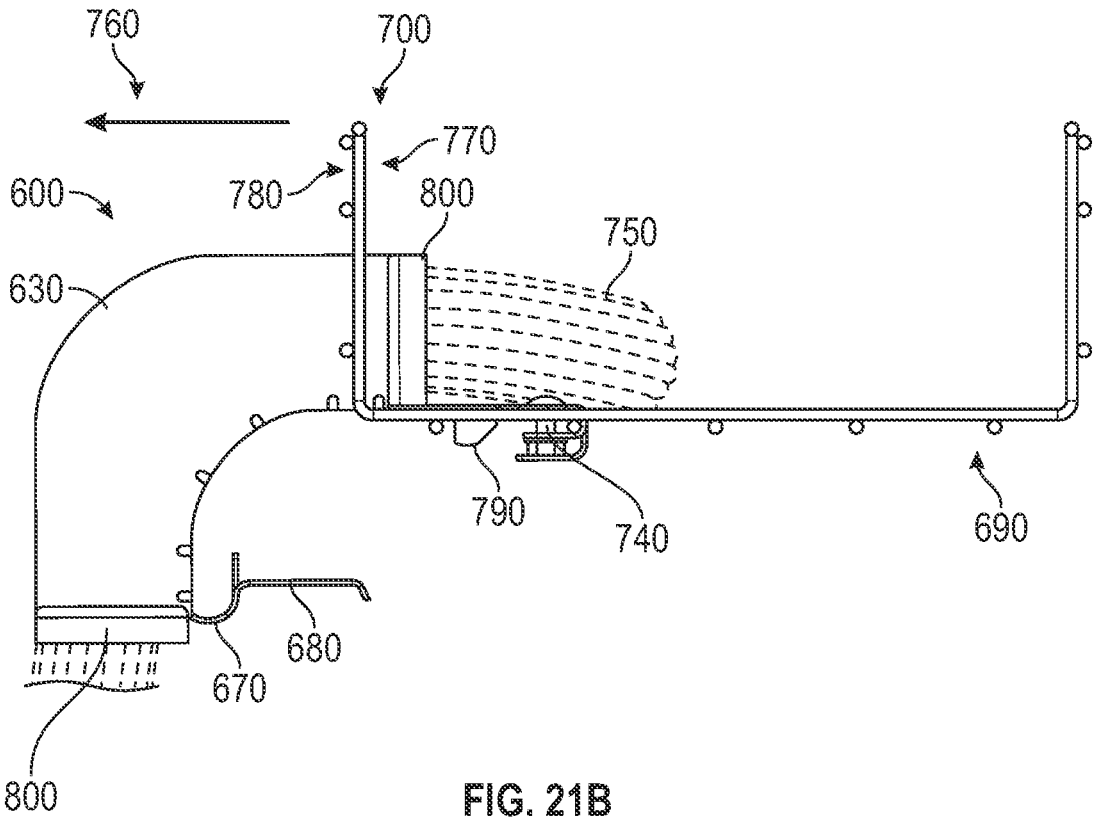

In a first orientation, as shown in FIGS. 19 and 21A-B, the exit adapter 600 may be installed to a floor 690 of a wire cable tray. In some installations, for example, a portion of a side wall 700 of the cable tray is removed (e.g., a section of the side wall is cut away). The exit adapter 600 can then be installed through the corresponding open section of the side wall in the first orientation. In other examples, however, other configurations are possible (e.g., with only some or none of the longitudinal wires in the side wall 700 removed).

In some examples, when the exit adapter 600 is installed on a modified cable tray, including as shown in FIGS. 21A and 21B, the at least one first support hook 660 engages with the floor 690 of the cable tray. For example, as shown, multiple support hooks 660 along the width of the ramp 610 can engage with a common longitudinal wire (or multiple wires) of the floor 690 of the cable tray. Thus, the hooks 660 can provide retention force against removal of the exit adapter 600 out of the open section of the side wall, as well as in other directions. Further, the extended length of the ramp 610 can rest on top of one or more wires of the floor 690 (e.g., seat directly on the one or more wires) to provide resistance against forces from the loading of cable onto the ramp 610 (e.g., against vertical and horizontal forces, as well as a counter-clockwise moment, relative to the perspective shown in FIG. 21B, due to the weight of installed cables).

During installation, the at least one first support hook 660 can be advanced through an opening between the longitudinal wires of the floor 690 of the cable tray (e.g., after being passed through an open section of the side wall 700, along a direction opposite the entrance direction 640 (see FIG. 19)). In particular, the exit adapter 600 can be thus advanced until the bottom side of the first end 610A of the ramp 610 is in contact with the floor 690 and the support hook(s) 660 are aligned to engage one or more corresponding wires of the floor 690 (e.g., a common longitudinal wire, as shown). Then, the exit adapter may be translated along an engagement direction 760 until the at least one first support hook 660 is engaged with a corresponding wire of the floor 690. In the example illustrated, the engagement direction 760 is parallel to the first entrance direction 640, but in other examples the engagement direction 760 can be oriented at a different angle relative to the first entrance direction 640.

In the illustrated example, multiple (e.g., each) of the first support hooks 660 engage with a common longitudinal wire of the floor 690. This arrangement may simplify installation or improve overall stability of the final installation. For example, in some installations, after the at least one first support hook 660 is engaged with a longitudinal wire of the cable tray, a fastener 740 may be inserted through the first opening 720 and the second opening 730 to further secure the exit adapter to the cable tray, or the support hook 660 can be otherwise mechanically fastened to the cable tray. Such an arrangement in particular can improve the overall strength of a modified tray by rigidly connecting the robust structure of the exit adapter 600 to the tray along a potentially weakened section thereof (i.e., due to the wires cut away to open the side of the tray). In some examples, multiple of the first support hooks 660 can be fastened to a common longitudinal wire of the floor 690, with still further corresponding improvements in security of attachment and structural rigidity.

As also generally discussed above, material of the ramp 610 can be seated over the top of one or more different wires of the cable tray than are engaged by the at least one support hook 660 (e.g., a different longitudinal wire of the floor 690, as shown). In some examples, including as shown in FIG. 21A, this material of the ramp (e.g., opposite the support surface 610C) can extend beyond corresponding first ends of the side walls 620, 630 of the exit adapter 600, in a direction opposite the entrance direction 640. Correspondingly, the ramp 610 can be engaged with the cable tray to provide an entrance for cable from the floor 690 (e.g., as also discussed above and below) with the wings 800 arranged in relatively close proximity to the side wall 700 of the cable tray. Thus, for example, the ramp 610 can be securely installed in a modified cable tray with the wings 800 protecting cables from cut edges of side wires of the tray but not extending excessively into the main cable pathway of the tray.

In some examples, an exit adapter may include side support tabs that can engage a floor of a cable tray in combination with one or more support hooks. For example, in some configurations, the exit adapter 600 may include at least one bendable side support tab 710. In some examples, the at least one bendable side support tab 710 is located on a same side of the exit adapter 600 as the side wall 620. In some examples, the at least one bendable side support tab 710 is located on a same side of the exit adapter 600 as the side wall 630. In some examples, the bendable side support tab 710 is located on both the side wall 620 and the side wall 630.

When the exit adapter 600 is installed on a modified tray, including as shown in FIGS. 21A and 21B, the at least one bendable side support tab 710 may be bent in a direction transverse to the first entrance direction 640, as shown in FIG. 21A. For example, the support tab 710 may be bent along a bend line that extends substantially in parallel with the first entrance direction 640.

In some examples, the bendable side support tab 710 can be bent so as to be in contact with (e.g., wrap partly around) a transverse wire of the cable tray (e.g., a transverse floor wire, as shown in FIG. 21A). In other examples, a side tab may not be bent or may be extend at different angles.

As another example, the first end 610A can include at least one side support tab 790. For example, the at least one side support tab 790 may be located on a same side of the first end 610A as either of the side walls 620, 630 (e.g., on both sides, as shown). As shown in FIG. 21B, the support tabs 790 can extend through the floor 690 of the cable tray to further assist in retaining the exit adapter 600 in the installed orientation (e.g., via contact with a different longitudinal wire than the hooks 660). In some examples, an entrance side of the at least one side support tab 790 may be angled relative to the entrance direction 640, to help guide alignment of the exit adapter 600 during installation or at other times.

In a second orientation, an exit adapter can be installed with hooks or support tabs engaging one or more wires on a side wall of a tray (e.g., with the exit adapter correspondingly rotated by 90-degrees or by another rotational offset relative to a first orientation). For example, an exit adapter may include a hooked structure and one or more support tabs that engage with a side wall of an unmodified cable tray. In this regard, for example, the second end 610A of the ramp 610 includes at least one second support hook 670. In the illustrated example, the support hook 670 provides an integrally formed hooked structure, extending from a connection with the support surface 610C of the ramp 610 continuously along a width of the ramp. In other examples, other hooked structures can be provided, including with discrete hooked tabs or different overall widths.

Generally, the at least one second support hook 670 can extend along the second entrance direction 650, from a furthest extent of the second support hook(s) 670, back toward the ramp 610, to define an interior area into which wires of a cable tray can be received. In the example shown in FIGS. 19 and 20, the at least one second support hooks 670 may extend back toward the ramp 610 substantially in parallel with the second entrance direction 650. In some examples, the free end of the second support hook 670 may be oriented in other directions relative to the second entrance direction 650, including so as to extend along the second entrance direction 650 obliquely thereto, or so as to extend perpendicular to the second entrance direction 650. In some examples, the at least one second support hook 670 may be integrally formed with the ramp 610.

In some configurations, an exit adapter may further include at least one support tab that extends transversely to the exit ramp. For instance, as shown in FIGS. 19 and 20, the exit adapter 600 includes at least one support tab 680 on the second end 610B. In some examples, the at least one support tab 680 is integrally formed with the ramp 610. In some examples, the at least one support tab 680 is integrally formed with the at least one second support hook 670. For example, as shown in FIG. 20, multiple support tabs 680 may separately extend from a continuous hook structure that provides the at least one second support hooks 670. In some examples, one or more of the support tabs 680 (e.g., each support tab of a plurality of support tabs 680) may extend from a corresponding discrete hooked structure (e.g., as part of a discrete-width hooked tab with a free end that extends away from a hooked portion of the tab, transverse to the entrance direction at the corresponding end of the ramp).

Figure 22A:
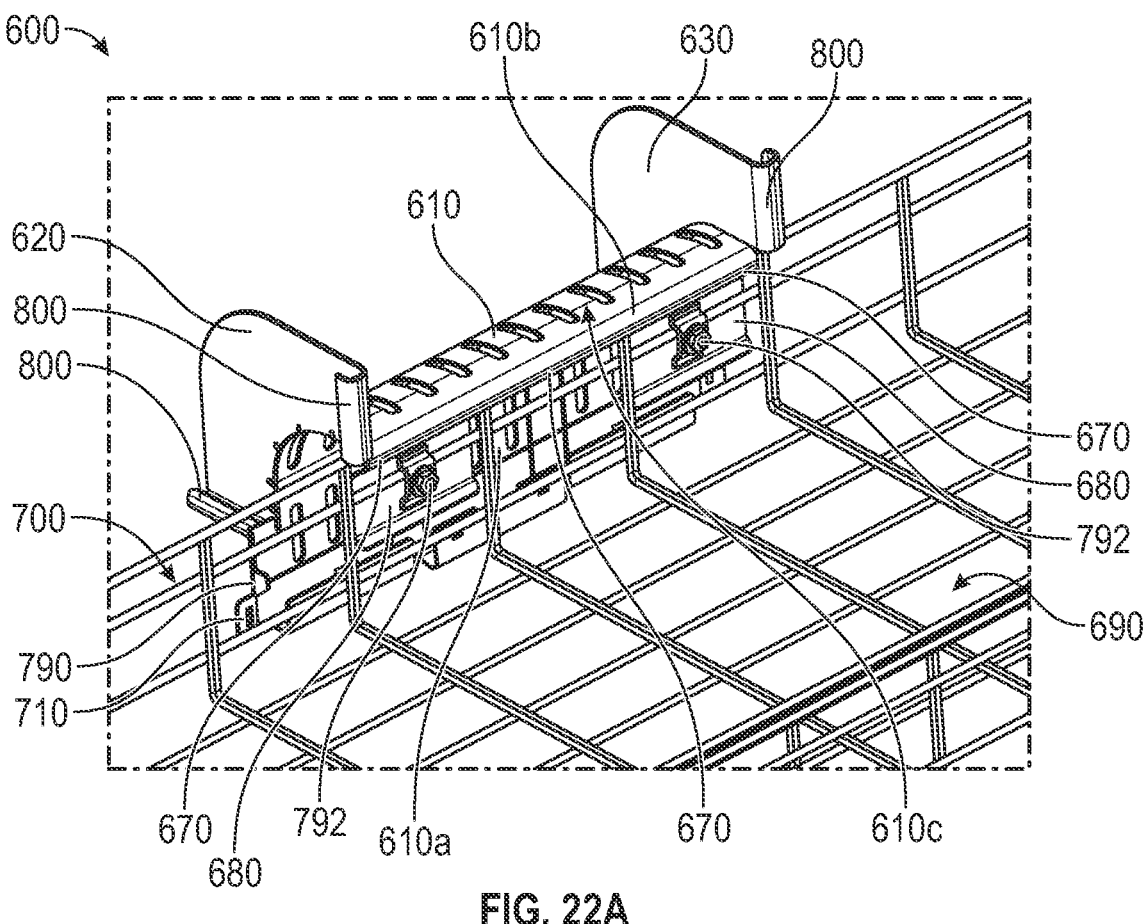
FIGS. 22A and 22B illustrate the exit adapter of FIGS. 19 and 20 installed in a second installed orientation on an unmodified cable tray.
Figure 22B:
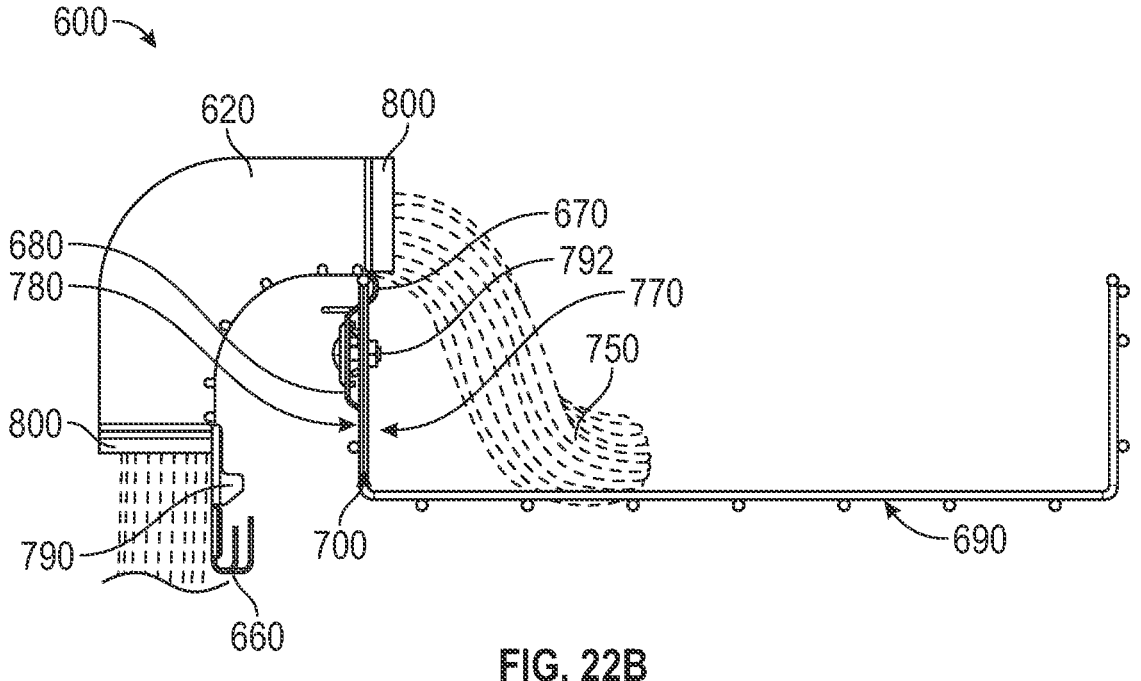

In some examples, the at least one support tab 680 may contain at least one third opening 810. The at least one third opening 810 can allow for a fastener 792 to be installed to further secure the exit adapter 600 to the side wall 700 in a second orientation with an unmodified cable tray. For example, as shown in FIG. 22A and further discussed below, the fastener 792 can be configured as a mechanical splice to secure wires of a cable tray to the at least one support tab 680.

In some examples, an exit adapter may be installed in a second orientation on a side wall of a cable tray. In some examples, the exit adapter can be thus secured via engagement with wires of a side wall of an unmodified cable tray. Referring to FIGS. 22A and 22B, for example, the exit adapter 600 is installed in a second orientation, secured to longitudinal wires of the side wall 700 of the cable tray. Thus, for example, the same exit adapter 600 can be adaptably used to route cable out of a wire cable tray whether the cable tray is modified or unmodified. Correspondingly, in some cases, a height between the ramp 610 and the floor 690 of the cable tray (e.g., a zero height, as shown in FIG. 21A) can thus be larger than a height between the ramp 610 and the floor 690 when the exit adapter 600 is secured in the first orientation (e.g., a non-zero height, as shown in FIG. 21B), although other configurations are possible in other examples.

In particular, with the exit adapter 600 in the second installed orientation, the at least one second support hook 670 engages with a first longitudinal wire of the side wall 700. Further, the at least one support tab 680 extend past the at least one second support hook 670 in a direction transverse to the second entrance direction 650 (see FIG. 20) to engage the cable tray at a different, offset location. In this regard, notches along the at least one support hook 670 (e.g., between discrete hooked sections) can provide clearance for vertical wires of the side wall 700.

Generally, the at least one support tab 680 can thus engage the cable tray at a lower location along the side wall 700 than does the at least one second support hook 670, with correspondingly ability to provide responsive forces to secure the cable tray against forces from cable loading. For example, as shown in FIGS. 22A and 22B, the at least one second support hook 670 can engage the cable tray at a longitudinal wire of the side wall (e.g., a top wire) that is spaced vertically apart from a different longitudinal wire engaged by the at least one support tab 680. Thus, the hook(s) and tab(s) 670, 680 can cooperatively secure the cable exit 600 against horizontal, vertical, and moment loading (e.g., against a counterclockwise moment, relative to the perspective of FIG. 22*b*). In some examples, the at least one tab 680 can engage other structure of a tray below the at least one second support hook 670, including different side wall wires than shown.

Still referring to FIGS. 22A and 22B, once the at least one second support hook 670 and at least one support tab 680 are engaged with longitudinal wires of the side wall 700, a fastener 792 may be installed through the at least one third opening 810 to secure the support tab 680 to the side wall 700. For example, as also noted above, the fastener 792 can be configured as a cable splice or various other known mechanical fastener assembly that can readily secure the at least one support tab 680 to a corresponding wire of the side wall 700.

Figures 23A, 23B, 23C, 23D:
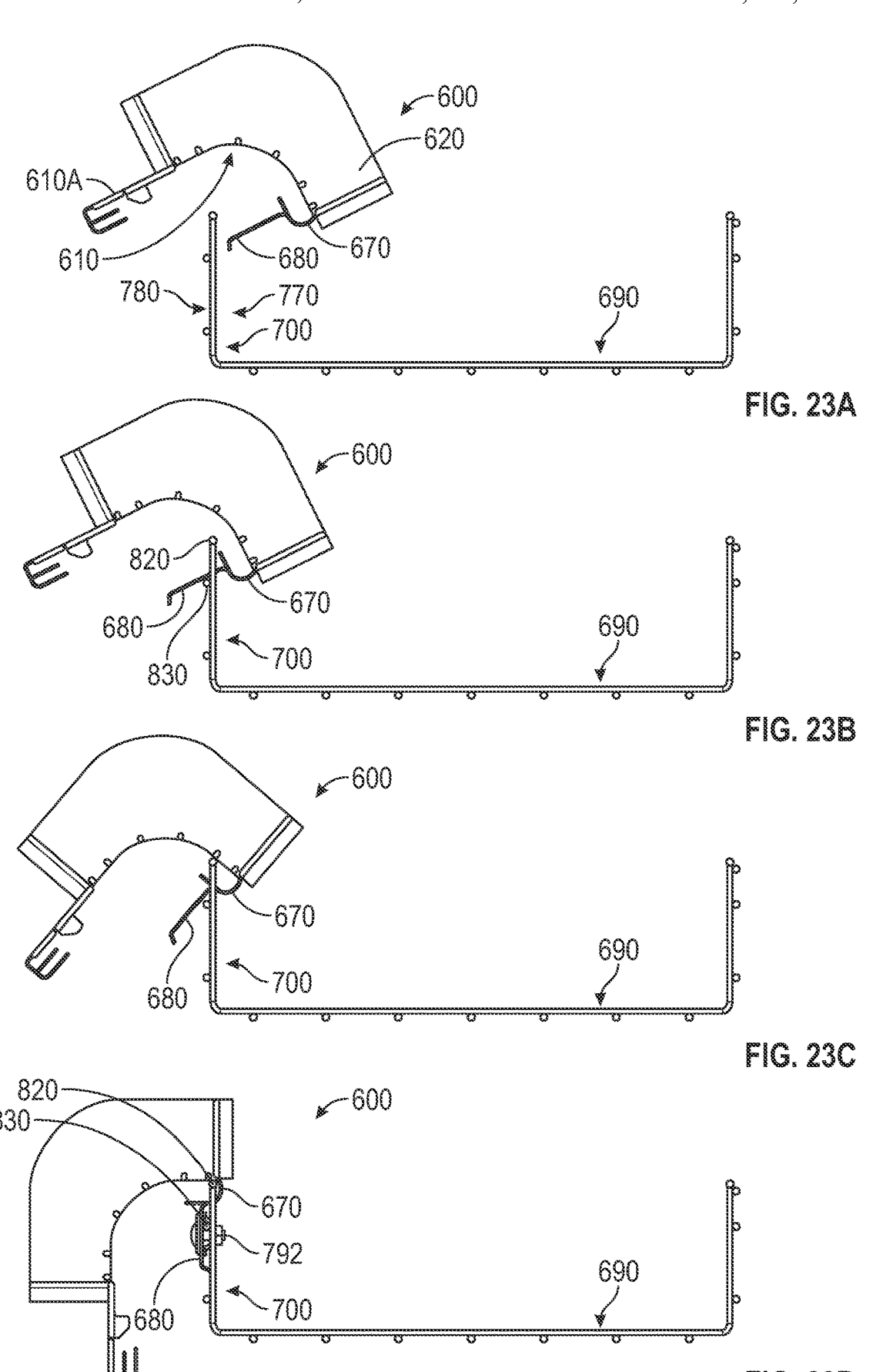
FIGS. 23A through 23D illustrate a method of installing the exit adapter of FIGS. 19 and 20.

FIGS. 23A through 23D display a method for installing the exit adapter 600 to a cable tray in the second orientation. As shown in FIGS. 23A and 23B, the at least one support tab 680 can be passed from an inner side 770 of the side wall 700, through the side wall 700, to an outer side 780 of the side wall 700 (e.g., passing under a top (or first) longitudinal wire 820 and above a lower (or second) longitudinal wire 830). Further, as shown in FIG. 23C, the exit adapter 600 can be rotated so that the interior of the at least one support hook 670 is moved into contact with a first longitudinal wire of the side wall 700 along the inner side 770 of the side wall 700 (e.g., into contact with the top wire 820). Similarly, the at least one support tab 680 can be rotated into contact with the outer side 780 of the side wall 700 (e.g., into contact with the lower longitudinal wire 830 of the side wall 700, below the top wire 820). As noted above, installing the exit adapter 600 may also then include further securing the support tab 680 to the side wall 700 (e.g., using the fastener 792).

Figure 24:
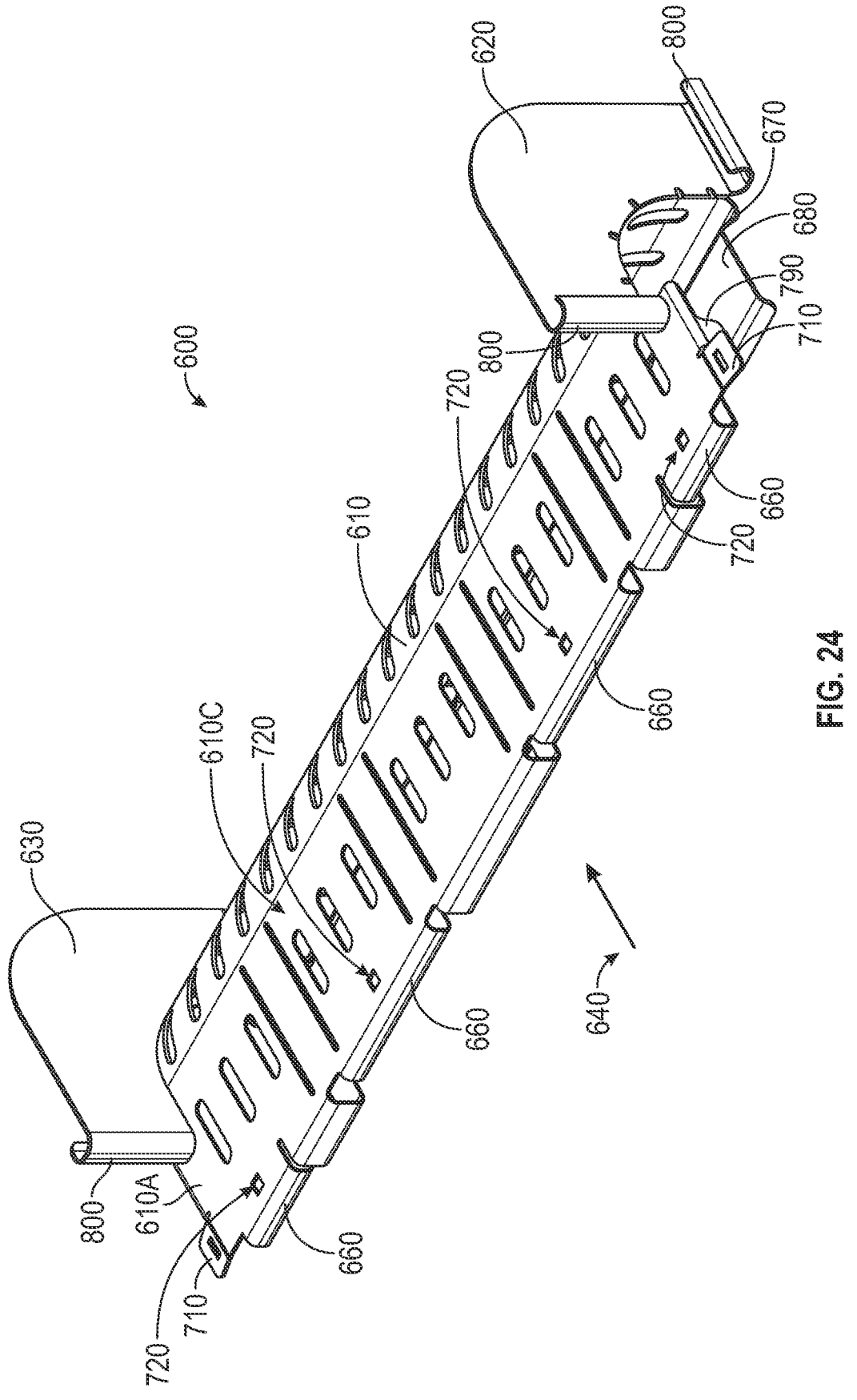
FIGS. 24 and 25 are isometric views of another configuration of the exit adapter of FIGS. 19 and 20.
Figure 25:
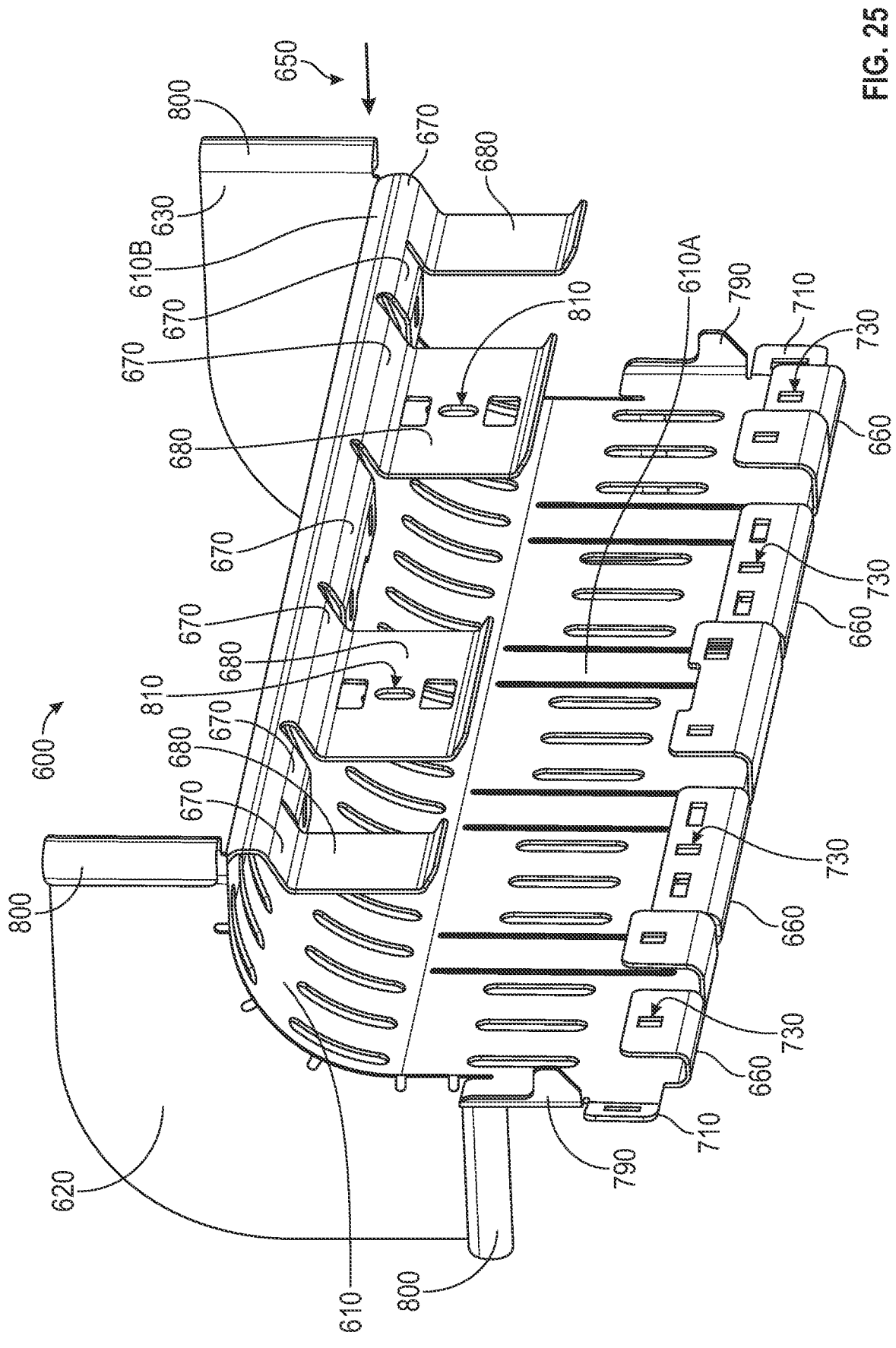

In different configurations, an exit adapter can exhibit different dimensions, or different numbers, shapes, or sizes of support tabs, support hooks, and so on. For example, a configuration of the exit adapter 600 as shown in FIGS. 24 and 25 may exhibit a longer width between sides and a correspondingly wider cable path than the configuration shown in FIGS. 19 through 23D. However, in the illustrated example, other than the increased length and differing numbers and locations of particular components along the adapter width, the exit adapter as shown in FIGS. 24 and 25 includes substantially similar features as the exit adapter 600, with similar functionality and installed orientations. Correspondingly, discussion of the exit adapter 600 relative to FIGS. 19 through 23D also applies to the exit adapter 600 FIGS. 24 and 25.

In particular, in the configuration of FIGS. 24 and 25, the second end 610B of the ramp 610 includes additional instances of the support tabs 680 extending from the at least one second support hook 670, with narrower tabs 680 at opposing sides and wider tabs 680 therebetween. Similarly, the first end 610A of the ramp 610 in the configuration of FIGS. 24 and 25 includes additional instances of the support hooks 660, with narrower hooks 660 at opposing sides and wider hooks 660 therebetween. Correspondingly, as generally noted above, the exit adapter 600 as shown in FIGS. 24 and 25 can be installed in a first orientation using the support hooks 660 (e.g., with modified cable tray) and in a second orientation using the support tabs 680 and the at least one second support hook 670, (e.g., with unmodified cable tray), using similar operations as described above relative to FIGS. 19 through 23D. Further, in other configurations, other variations may be present, including relative to number, location, width or other details of the various support hooks and tabs, without departing from the principles discussed above relative to the exit adapter 600 in general.

As discussed above, various hooks and tabs can be included on an exit adapter to allow the exit adapter to be selectively secured at different locations and in different orientations on cable trays, including for modified and unmodified wire cable trays. In this regard, although particular hook or tab structures are discussed relative to particular examples above, it should be understood that other arrangements are possible. For example, hooks or tabs that are discussed relative to particular example exit adapters above can be substituted into or otherwise added on to various other exit adapters, including exit adapters from other expressly presented examples or variations of the exit adapter of the particular example. Thus, for example, hooked structures or support tabs described relative to any of the exit adapters 100, 200, 300 400, 500, 600 can be substituted for (or added as a supplement to) hooked structures or other support tabs in any others of the exit adapters 100, 200, 300 400, 500, 600. Similarly, configurations of guide wings illustrated for particular examples (e.g., fixed or removable guide wings) can be readily used with other examples, as desired. In some examples, hooked structures or support tabs described relative to any of the exit adapters 100, 200, 300 400, 500, 600 can be provided on a different end of the relevant ramp than expressly illustrated (e.g., in combination with other hooked structures or support tabs that are included on the different end of the ramp, in the source example or others).

Thus, examples of the disclosed technology provide improved exit adapters, including as can selectively be installed in different orientations. For example, some exit adapters can be selectively installed on modified trays (e.g., to receive cables from a tray floor) or on unmodified trays (e.g., to guide cables over a tray side). Further, some exit adapters can allow operators to install an adapter with different heights of a ramp relative to a tray floor, including as can allow a single exit adapter to be selectively installed with a variety of different tray configurations.

As used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Also as used herein, unless otherwise limited or defined, "substantially parallel" indicates a direction that is within ±12 degrees of a reference direction (e.g., within ±6 degrees or ±3 degrees), inclusive. Similarly, unless otherwise limited or defined, "substantially perpendicular" similarly indicates a direction that is within ±12 degrees of perpendicular a reference direction (e.g., within ±6 degrees or ±3 degrees), inclusive. Correspondingly, "substantially vertical" indicates a direction that is substantially parallel to the vertical direction, as defined relative to the reference system (e.g., a local direction of gravity, by default), with a similarly derived meaning for "substantially horizontal" (relative to the horizontal direction). Discussion of directions "transverse" to a reference direction indicate directions that are not substantially parallel to the reference direction. Correspondingly, some transverse directions may be perpendicular or substantially perpendicular to the relevant reference direction.

Also as used herein, discussion of an "entrance" direction or feature is presented relative to a cable passing from a cable tray onto a cable exit. This framing is adopted for clarity of discussion and is not intended to be limiting relative to particular cable routing operations. For example, those of skill in the art will recognize that whether cable is to be considered as "exiting" or "entering" a tray may vary, dependent on perspective or relative to particular installation operations (e.g., in which cable is actively routed from a cable tray onto a cable exit, or vice versa). Correspondingly, unless otherwise indicated or required, it should be understood that reference to an "entrance" direction herein necessarily implies (and includes) a reversed perspective, in which an "exit" direction for cable extends opposite the described entrance direction.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

Also as used herein, unless otherwise limited or defined, "integral" and derivatives thereof (e.g., "integrally") describe elements that are manufactured as a single piece without fasteners, adhesive, or the like to secure separate components together. For example, an element that is stamped, cast, or otherwise molded as a single-piece component from a single piece of sheet metal or using a single mold, without rivets, screws, other fasteners, or adhesive to hold separately formed pieces together is an integral (and integrally formed) element. In contrast, an element formed from multiple pieces that are separately formed initially then later connected together, is not an integral (or integrally formed) element.

In some implementations, devices or systems disclosed herein can be utilized, manufactured, installed, etc. using methods embodying aspects of the disclosed technology. Correspondingly, any description herein of particular features, capabilities, or intended purposes of a device or system should be considered to disclose, as examples of the disclosed technology a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, should be understood to disclose, as examples of the disclosed technology, the utilized features and implemented capabilities of such device or system.

The previous description of the disclosed examples is provided to enable any person skilled in the art to make or use the invention. Various modifications to these examples will be readily apparent to those skilled in the art, and the generic principles defined herein may be applied to other examples without departing from the spirit or scope of the disclosed technology. Thus, the invention is not intended to be limited to the examples shown herein but is to be accorded the widest scope consistent with the principles and novel features disclosed herein.

We claim:

1. An exit adapter for a cable tray, the exit adapter comprising:

a ramp that defines a support surface for a cable that extends between a first end of the ramp and a second end of the ramp;

a first side wall connected to the ramp at a first side of the ramp; and a second side wall connected to the ramp at a second side of the ramp opposite the first side;

the first end of the ramp including first support hooks; and the second end of the ramp including: one or more second support hooks, and support tabs that extend transverse to the support surface at the second end of the ramp;

the exit adapter having a first installed orientation and a second installed orientation, in the first installed orientation, the first end being oriented to provide a first cable entrance onto the ramp from the cable tray, and the first support hooks being oriented to engage a floor of the cable tray to secure the ramp to the cable tray with the support surface extending through a side of the cable tray that extends upwardly from the floor, and in the second installed orientation, the second end being oriented to provide a second cable entrance onto the ramp from the cable tray, and the one or more second support hooks and the support tabs being oriented to engage the side of the cable tray to secure the ramp to the cable tray with the support surface extending over the side of the cable tray.

2. The exit adapter of claim 1, wherein in the first installed orientation the first end of the ramp is higher than the second end of the ramp, and in the second installed orientation the second end of the ramp is higher than the first end of the ramp; and wherein one or more of:

the support tabs extend integrally from the one or more second support hooks; or the first end of the ramp extends past first ends of the first and second side walls and the first support hooks extend from a furthest extent back along an entrance direction for the cable at the first cable entrance.

3. A method of supporting cables relative to a cable tray, the method comprising:

selectively orienting an exit adapter for installation in either of a first installed orientation or a second installed orientation, the exit adapter including a ramp that extends between a first end and a second end, a first side wall connected to the ramp at a first side of the ramp and a second side wall connected to the ramp at a second side of the ramp opposite the first side; and selectively installing the exit adapter:

in the first installed orientation, by engaging a floor of the cable tray with first support hooks that extend from the first end of the ramp, to secure the ramp to the cable tray with the first end providing a first cable entrance onto the ramp from the cable tray and with a support surface of the ramp extending through a side of the cable tray that extends upwardly from the floor; or in the second installed orientation, by engaging the side of the cable tray with one or more second support hooks that extend from the second end of the ramp and with support tabs that extend from the second end of the ramp, to secure the ramp to the cable tray with the second end providing a second cable entrance onto the ramp from the cable tray, with the support surface extending over the side of the cable tray and with the support tabs extending transverse to the support surface at the second end of the ramp.

4. The method of claim 3, wherein selectively installing the exit adapter in the first installed orientation includes engaging the first support hooks on a first wire of the floor and further seating the exit adapter on a second wire of the floor different from the first wire.

5. The method of claim 4, wherein installing the exit adapter in the first installed orientation further comprises:

securing the first support hooks to a common longitudinal wire of the floor of the cable tray using fasteners.

6. The method of claim 4, wherein installing the exit adapter in the first installed orientation further comprises:

securing the first support hooks to a longitudinal wire of the floor of the cable tray; and bending side support tabs that extend from the first end of the ramp to engage transverse wires of the floor of the cable tray.

7. The method of claim 3, wherein installing the exit adapter in the second installed orientation further comprises:

engaging the one or more second support hooks with a first longitudinal wire of the side of the cable tray; and engaging the support tabs with a second longitudinal wire of the side of the cable tray that is spaced vertically apart from the first longitudinal wire.

8. The method of claim 7, wherein the one or more second support hooks are engaged with the first longitudinal wire from an inner side of the side of the cable tray; and wherein the support tabs are engaged with the second longitudinal wire from an outer side of the side of the cable tray.

9. The method of claim 8, wherein installing the exit adapter in the second installed orientation further comprises:

passing the support tabs through the side of the cable tray, from the inner side to the outer side, to engage the support tabs with the second longitudinal wire.

10. The method of claim 9, wherein installing the exit adapter in the second installed orientation further comprises:

securing the support tabs to the second longitudinal wire using fasteners.

11. An exit adapter for a cable tray with a side and a floor formed of wires, the exit adapter comprising:

a ramp that extends between a first end of the ramp and a second end of the ramp;

a first side wall connected to the ramp at a first side of the ramp; and a second side wall connected to the ramp at a second side of the ramp opposite the first side;

the ramp, the first side wall, and the second side wall defining a cable path along the ramp, with a first entrance direction for a cable defined between the first and second side walls at the first end of the ramp and a second entrance direction for the cable defined between the first and second side walls at the second end of the ramp, the second entrance direction being transverse to the first entrance direction;

the first end of the ramp including a first support hook that extends to a free end along the first entrance direction; and the second end of the ramp including a second support hook, and a support tab that extends transverse to the second entrance direction;

the exit adapter having a first installed orientation and a second installed orientation, in the first installed orientation, the first end of the ramp providing a first entrance onto the ramp from the cable tray, with the first support hook oriented to engage the floor of the cable tray to secure the ramp at a first height above the floor, and in the second installed orientation, the second end of the ramp providing a second entrance onto the ramp from the cable tray, with the second support hook and the support tab oriented to engage the side of the cable tray to secure the ramp at a second height above the floor.

12. The exit adapter of claim 11, wherein the first support hook, the second support hook, and the support tab are integrally formed with the ramp.

13. The exit adapter of claim 11, wherein the first end of the ramp includes a first plurality of support hooks, including the first support hook; and wherein, in the first installed orientation, each support hook of the first plurality of support hooks is oriented to engage the floor of the cable tray to secure the ramp at the first height above the floor.

14. The exit adapter of claim 11, wherein the second end of the ramp includes a plurality of support tabs that extend transverse to the second entrance direction, including the support tab; and wherein, in the second installed orientation, each support tab of the plurality of support tabs is oriented to engage the side of the cable tray to secure the ramp at the second height above the floor.

15. The exit adapter of claim 14, wherein the plurality of support tabs extend from the second support hook.

16. The exit adapter of claim 14, wherein, in the second installed orientation, the plurality of support tabs extend transverse to the second entrance direction to engage a different longitudinal wire of the side of the cable tray than the second support hook.

17. The exit adapter of claim 11, wherein the first end of the ramp extends past first ends of the first and second side walls in a direction opposite the first entrance direction.

18. The exit adapter of claim 17, wherein the first end of the ramp further includes side support tabs arranged to engage the floor of the cable tray with the exit adapter in the first installed orientation.

19. The exit adapter of claim 18, wherein the side support tabs are bendable to engage transverse wires of the floor of the cable tray in the first installed orientation.

20. The exit adapter of claim 11, wherein the first end of the ramp includes a first opening and the first support hook includes a second opening; and wherein, in the first installed orientation, the first and second openings are aligned to receive a fastener to secure the first support hook to a longitudinal wire of the floor.

\* \* \* \* \*